US009873446B2

(12) United States Patent
Gardner et al.

(10) Patent No.: US 9,873,446 B2
(45) Date of Patent: Jan. 23, 2018

(54) STEERING GRIP LIGHT BAR SYSTEMS

(71) Applicant: TK Holdings Inc., Auburn Hills, MI (US)

(72) Inventors: Valerie D Gardner, St Clair, MI (US); Jason Carl Lisseman, Shelby Township, MI (US); David Ryan Varcoe, Bruce Township, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 110 days.

(21) Appl. No.: 14/806,325

(22) Filed: Jul. 22, 2015

(65) Prior Publication Data
US 2016/0025281 A1     Jan. 28, 2016

Related U.S. Application Data

(60) Provisional application No. 62/027,969, filed on Jul. 23, 2014.

(51) Int. Cl.
*B62D 1/04* (2006.01)
*B62D 1/06* (2006.01)
(Continued)

(52) U.S. Cl.
CPC .............. *B62D 1/046* (2013.01); *B60K 35/00* (2013.01); *B60Q 9/00* (2013.01); *B62D 1/06* (2013.01);
(Continued)

(58) Field of Classification Search
CPC .......... B62D 1/046; B62D 1/06; B60K 35/00; B60K 2350/928; B60Q 9/00; B60Q 3/283;
(Continued)

(56) References Cited

U.S. PATENT DOCUMENTS 3,485,974 A    12/1969  Wolf et al.
4,835,512 A     5/1989  Bratton
(Continued)

FOREIGN PATENT DOCUMENTS

CN      101639181      2/2010
CN      201487849      5/2010
(Continued)

OTHER PUBLICATIONS

U.S. Appl. No. 14/061,397, filed Oct. 23, 2013.
(Continued)

*Primary Examiner* — Bao Q Truong
(74) *Attorney, Agent, or Firm* — Meunier Carlin & Curfman LLC

(57) ABSTRACT

Various implementations include a light bar system for a steering wheel of a vehicle that includes a high intensity light source, a light diffusing layer, and an outer lens. For example, in certain implementations, the light diffusing layer is disposed between a plurality of high intensity light emitting diodes (LEDs) and an outer lens, and the light diffusing layer causes the light from the LEDs to appear as a continuous stream of light across a length of the lens and provides sufficiently bright lighting to warn or communicate with the driver in various ambient lighting conditions. In certain implementations, the outer lens is colored to blend in with the rest of the steering wheel when the LEDs are not activated.

25 Claims, 20 Drawing Sheets

(51) Int. Cl.
*B60K 35/00* (2006.01)
*B60Q 9/00* (2006.01)
*B60Q 3/283* (2017.01)

(52) U.S. Cl.
CPC ........ *B60K 2350/928* (2013.01); *B60Q 3/283* (2017.02)

(58) Field of Classification Search
CPC ... B60Q 3/00; F21V 5/002; F21V 7/00; F21V 13/00; F21V 13/04; F21Y 2115/10
See application file for complete search history.

(56) References Cited

U.S. PATENT DOCUMENTS

| | | | |
|---|---|---|---|
| 4,993,281 A | 2/1991 | Miller | |
| 5,203,226 A * | 4/1993 | Hongou | B60K 35/00 362/460 |
| 5,516,143 A | 5/1996 | Lang et al. | |
| 5,558,364 A | 9/1996 | Davis | |
| 5,661,839 A | 8/1997 | Whitehead | |
| 5,666,102 A | 9/1997 | Lahiff | |
| 5,895,115 A | 4/1999 | Parker et al. | |
| 6,190,026 B1 | 2/2001 | Moore | |
| 6,296,380 B1 | 10/2001 | Dawli | |
| 6,538,405 B1 | 3/2003 | Brzozowski et al. | |
| 6,651,526 B1 | 11/2003 | Imaizumi et al. | |
| 6,668,682 B1 | 12/2003 | Emeneth et al. | |
| 6,703,999 B1 | 3/2004 | Iwanami | |
| 6,768,067 B2 | 7/2004 | Adachi et al. | |
| 6,817,100 B2 | 11/2004 | Mori et al. | |
| 7,143,663 B2 | 12/2006 | Menaldo et al. | |
| 7,173,536 B2 | 2/2007 | Duval | |
| 7,377,186 B2 | 5/2008 | Duval | |
| 7,414,520 B2 | 8/2008 | Meissner | |
| 7,468,656 B1 | 12/2008 | Frank | |
| 7,525,449 B1 | 4/2009 | Lafontaine | |
| 7,602,278 B2 | 10/2009 | Prost-Fin et al. | |
| 7,605,693 B2 | 10/2009 | Kulas | |
| 7,605,694 B2 | 10/2009 | Prost-Fin et al. | |
| 7,672,759 B1 | 3/2010 | Lafontaine | |
| 7,679,495 B2 | 3/2010 | Beutnagel-Buchner et al. | |
| 7,680,574 B2 | 3/2010 | Berg et al. | |
| 7,786,886 B2 | 8/2010 | Maruyama et al. | |
| 7,969,531 B1 | 6/2011 | Li et al. | |
| 7,987,030 B2 | 7/2011 | Flores et al. | |
| 7,997,612 B2 | 8/2011 | Gulde | |
| 8,061,861 B2 | 11/2011 | Paxton et al. | |
| 8,067,709 B2 | 11/2011 | Han et al. | |
| 8,136,425 B2 | 3/2012 | Bostick | |
| 8,210,564 B2 | 7/2012 | Helmstetter et al. | |
| 8,269,452 B2 | 9/2012 | Watanabe | |
| 8,645,001 B2 | 2/2014 | Basson et al. | |
| 8,761,565 B1 | 6/2014 | Coleman et al. | |
| 9,134,729 B1 | 9/2015 | Szybalski et al. | |
| 9,223,638 B2 | 12/2015 | Hudzia et al. | |
| 9,308,856 B2 * | 4/2016 | Lisseman | B62D 1/046 |
| 9,308,857 B2 | 4/2016 | Lisseman et al. | |
| 2002/0068605 A1 | 6/2002 | Stanley | |
| 2003/0121360 A1 | 7/2003 | Hussy | |
| 2004/0045396 A1 | 3/2004 | Hosokawa et al. | |
| 2005/0021190 A1 | 1/2005 | Worrell et al. | |
| 2006/0236807 A1 | 10/2006 | Yasuda et al. | |
| 2008/0023253 A1 | 1/2008 | Prost-Fin et al. | |
| 2008/0202282 A1 | 8/2008 | Bassett et al. | |
| 2009/0096937 A1 | 4/2009 | Bauer | |
| 2009/0189373 A1 | 7/2009 | Schramm et al. | |
| 2009/0223321 A1 | 9/2009 | Stefani | |
| 2010/0107806 A1 | 5/2010 | Corinaldi et al. | |
| 2010/0194080 A1 | 8/2010 | Paxton et al. | |
| 2010/0218641 A1 | 9/2010 | Neumann et al. | |
| 2011/0153160 A1 | 6/2011 | Hesseling et al. | |
| 2011/0187518 A1 | 8/2011 | Strumolo et al. | |
| 2011/0198201 A1 | 8/2011 | Chuang | |
| 2011/0198999 A1 | 8/2011 | Honma et al. | |
| 2012/0013490 A1 | 1/2012 | Pance | |
| 2012/0146776 A1 | 6/2012 | Eguchi | |
| 2012/0267222 A1 | 10/2012 | Gohng et al. | |
| 2013/0152721 A1 | 6/2013 | Trendov et al. | |
| 2014/0109719 A1 | 4/2014 | Lisseman et al. | |
| 2014/0111324 A1 | 4/2014 | Lisseman et al. | |
| 2014/0111325 A1 | 4/2014 | Lisseman et al. | |
| 2014/0111736 A1 | 4/2014 | An et al. | |
| 2014/0244115 A1 | 8/2014 | Sanma et al. | |

FOREIGN PATENT DOCUMENTS

| | | |
|---|---|---|
| CN | 201998981 | 10/2011 |
| CN | 202371573 U | 8/2012 |
| DE | 20018732 | 2/2001 |
| DE | 20014731 | 2/2002 |
| DE | 10113493 | 9/2002 |
| DE | 102005013202 | 9/2006 |
| EP | 0801373 | 10/1997 |
| FR | 2744976 | 8/1997 |
| JP | 10-059190 A | 3/1998 |
| JP | 2000-153769 A | 6/2000 |
| JP | 2001055149 | 2/2001 |
| JP | 2005/088792 | 4/2005 |
| JP | 2004-148911 A | 5/2007 |
| JP | 2007-114379 A | 5/2007 |
| JP | 2007153048 | 6/2007 |
| JP | 2009/018722 | 1/2009 |
| JP | 2010-017007 A | 1/2010 |
| JP | 2010-241275 A | 10/2010 |
| JP | 2012-093584 A | 5/2012 |
| JP | 2012-129742 A | 7/2012 |
| KR | 10-2014-0107864 | 9/2014 |
| WO | 98/03365 | 1/1998 |
| WO | 02/096745 | 12/2002 |
| WO | 2005/025936 | 3/2005 |
| WO | 2006/076903 | 7/2006 |
| WO | 2006/076904 | 7/2006 |
| WO | 2006/127835 | 11/2006 |
| WO | 2009/111098 | 9/2009 |
| WO | 2010/051090 | 5/2010 |
| WO | 2010/087931 | 8/2010 |
| WO | 2010131305 A1 | 11/2012 |
| WO | 2014/066476 | 5/2014 |
| WO | 2014/066512 | 5/2014 |
| WO | 2014066477 | 5/2014 |

OTHER PUBLICATIONS

Notice of Allowance, dated Sep. 9, 2015, received in connection with U.S. Appl. No. 14/061,397.
Non-final Office Action, dated Mar. 13, 2015, received in connection with U.S. Appl. No. 14/061,397.
U.S. Appl. No. 14/061,383, filed Oct. 23, 2013.
Final Office Action, dated Aug. 25, 2015, received in connection with U.S. Appl. No. 14/061,383.
Non-final Office Action, dated Feb. 18, 2015, received in connection with U.S. Appl. No. 14/061,383.
U.S. Appl. No. 14/061,408, filed Oct. 23, 2013.
Final Office Action, dated Aug. 25, 2015, received in connection with U.S. Appl. No. 14/061,408.
Non-final Office Action, dated Feb. 18, 2015, received in connection with U.S. Appl. No. 14/061,408.
Design U.S. Appl. No. 29/524,993, filed Apr. 24, 2015.
Design U.S. Appl. No. 29/524,998, filed Apr. 24, 2015.
Design U.S. Appl. No. 29/525,000, filed Apr. 24, 2015.
International Preliminary Report on Patentability, dated Apr. 28, 2015, received in connection with International Patent No. PCT/US2013/066329.
International Search Report and Written Opinion, dated Feb. 7, 2014, received in connection with International Patent Application No. PCT/US2013/066329.
International Preliminary Report on Patentability, dated Apr. 28, 2015, received in connection with International Patent No. PCT/US2013/066330.

(56) References Cited

OTHER PUBLICATIONS

International Search Report and Written Opinion, dated Feb. 7, 2014, received in connection with International Patent Application No. PCT/US2013/066330.
International Preliminary Report on Patentability and Written Opinion, dated Apr. 28, 2015, received in connection with International Patent No. PCT/US2013/066399.
International Search Report and Written Opinion, dated Feb. 7, 2014, received in connection with International Patent Application No. PCT/US2013/066399.
U.S. Appl. No. 14/635,547, filed Mar. 2, 2015.
International Search Report and Written Opinion, dated Oct. 29, 2015, received in connection with International Patent Application No. PCT/US2015/041582.
International Search Report and Written Opinion conducted in International Application No. PCT/US2016/29218, dated Aug. 5, 2016.
Co-pending U.S. Appl. No. 15/137,646, filed Apr. 25, 2016 and its file history.
Office Action issued in U.S. Appl. No. 15/075,527, dated Sep. 20, 2016.
Office Action issued in U.S. Appl. No. 15/075,519, dated Sep. 20, 2016.
International Preliminary Report on Patentability received in International Patent Application No. PCT/US2013/066330, dated May 7, 2015.
Office Action in U.S. Appl. No. 14/307,780, dated Mar. 28, 2017.
Office Action in U.S. Appl. No. 14/307,780, dated Oct. 28, 2016.
English translation of Office Action dated Jun. 28, 2016 from Chinese application 201380055394.4.
English translation of Office Action dated Jun. 2, 2016 from Chinese application 201380055405.9.
Office Action issued in counterpart Japanese Application No. 2010-523275 dated Jun. 5, 2012 (2 pages) and an English translation of the same (1 page).
English translation of the International Preliminary Report on Patentability (Chapter I or Chapter II of the Patent Cooperation Treaty) from the International Bureau of WIPO for International Application No. PCT/DE2008/001527 dated Apr. 7, 2010, 17 pages.
International Preliminary Report on Patentability issued in International Application No. PCT/US2015/041582 dated Feb. 2, 2017.
Office action (English translation) from CN Application No. 201380055391.0 dated Jul. 29, 2016.
Office Action issued in related Chinese Application No. 201380055391.0 dated Apr. 19, 2017 (15 pages) and an English translation of the same (10 pages).
Office Action issued in Japanese Application No. JP2015-538159, dated Aug. 29, 2017.
Office Action issued in Japanese Application No. JP2015-538153, dated Aug. 29, 2017.
Office Action issued in Japanese Application No. JP2015-538152, dated Aug. 29, 2017.
Third Office Action issued in Chinese Application No. 201380055394.4, dated Sep. 9, 2017.

* cited by examiner

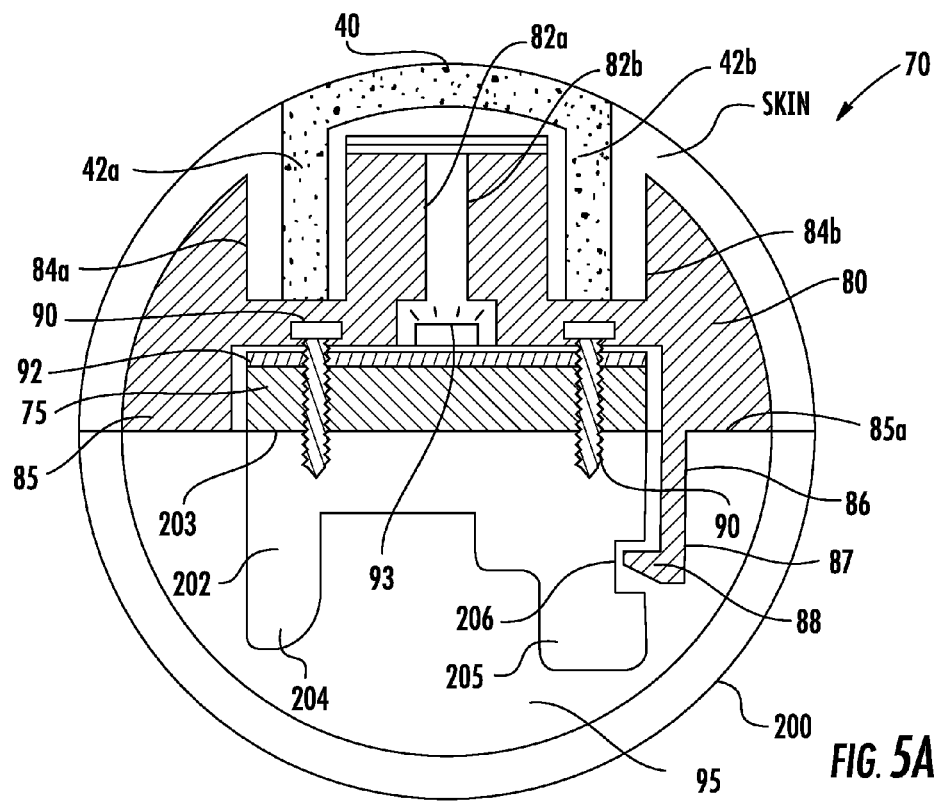
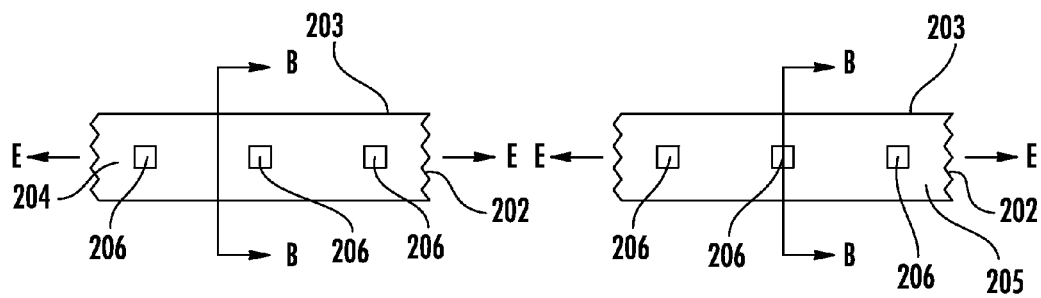

STEERING GRIP LIGHT BAR SYSTEMS

CROSS REFERENCE TO RELATED APPLICATIONS

This application claims priority to U.S. Provisional Patent Application No. 62/027,969, entitled "Steering Grip Light Bar Systems," which was filed on Jul. 23, 2014, the content of which is herein incorporated by reference in its entirety.

BACKGROUND

Various advanced driver assistance systems incorporate visual, acoustic, and/or haptic warnings for drivers. Visual interfaces for these systems should minimize driver reaction time to warnings and the workload of the driver to comprehend and respond to the warning or information. Conventional instrument panel and center-stack displays require the driver's attention be drawn away from the navigating the vehicle. Similarly, idealized heads up displays can be jarring and sometimes distracting to the driver.

Accordingly, there is a need in the art for improved systems and methods of providing visual interfaces in vehicles.

BRIEF SUMMARY

Various implementations disclosed herein include a light bar system for a steering wheel (or grip) of a vehicle. The light bar system includes a high intensity light source and a light diffusing layer disposed on a portion of the steering wheel. The light from the light source is diffused through the light diffusing layer, and the diffused light is emitted toward a driver or operator of the vehicle. For example, in certain implementations, the light bar system includes a plurality of high intensity light emitting diodes (LEDs) disposed behind an outer lens, and the light diffusing layer is a film disposed between an inner surface of the outer lens and the LEDs. In other implementations, the outer lens may diffuse light on its own or in combination with one or more light altering films. The light exiting the outer surface of the outer lens appears as a continuous stream of light across a length of the lens and provides sufficiently bright lighting to warn or communicate with the driver in various ambient lighting conditions. In certain implementations, the outer lens is colored to blend in with the rest of the steering wheel when the LEDs are not activated. The outer lens and/or one or more light altering films disposed between the outer lens and the LEDs prevent ambient light from entering the lens and illuminating the LEDs or components behind the lens, which reduces distractions and the potential for false warnings or unintended communications with the driver.

In particular, according to various implementations, a light bar system for a steering wheel includes at least one light emitting diode (LED) disposed adjacent a portion of an armature of a steering wheel, a housing that defines a light optimizing channel, and a light diffusing layer that has an inner surface and an outer surface. The light optimizing channel has a proximal end disposed adjacent the LED, and the inner surface of the light diffusing layer is disposed adjacent a distal end of the light optimizing channel. The light diffusing layer is configured for diffusing light as it passes through the layer from the inner surface to the outer surface. In addition, the light optimizing channel may include a reflective surface that extends between the proximal and distal ends. In certain implementations, the light diffusing layer is configured to cause the light being diffused there through to appear as a continuous stream of light across the light diffusing layer.

For example, in some implementations, the light diffusing layer may be a film coupled to an inner surface of an outer lens. An outer surface of the outer lens faces a driver (or operator) of the vehicle, and the inner surface of the lens is adjacent the distal end of the light optimizing channel. In certain implementations, the outer surface of the outer lens is configured for being disposed substantially flush with an outer skin of the steering wheel. The light bar system may also include one or more additional light altering films disposed between the distal end of the light optimizing channel and the inner surface of the outer lens. The light altering film may include a brightness enhancing film, a light diffusing film, and/or a light turning film. For example, the light altering film may include a light diffusing film and a brightness enhancing film. The light diffusing film is disposed adjacent the light optimizing channel, and the brightness enhancing film is disposed adjacent the outer lens. As another example, the system may also include a light turning film that is disposed between the brightness enhancing film layer and the lens.

In various implementations, the outer lens may be at least partially translucent and/or partially opaque. In other implementations, the outer lens may be at least partially transparent.

In some implementations, a light bar system for a steering wheel includes at least one light source disposed adjacent a portion of an armature of a steering wheel; and a light diffusing layer having a first surface and a second surface. The first surface of the light diffusing layer is disposed adjacent the light source, and the light diffusing layer is configured for diffusing light as light passes there through from the first surface to the second surface such that the light exiting the second surface appears as a continuous stream of light across the second surface of the light diffusing layer.

In various implementations, a light bar system for a steering wheel includes at least one light source disposed adjacent a portion of an armature of a steering wheel; and a light diffusing layer having an inner surface and an outer surface. The light is diffused as it passes through the light diffusing layer from the inner surface to the outer surface, and the inner surface of the light diffusing layer is spaced apart from the light source such that an air gap is defined between the inner surface and the light source. The light exiting the outer surface appears as a continuous stream of light across the outer surface.

BRIEF DESCRIPTION OF DRAWINGS

Various implementations of the system are described in detail in relation to the following drawings. The drawings are merely exemplary to illustrate the structure of certain implementations. Certain features shown herein may be used singularly or in combination with other features. The invention should not be limited to the implementations shown.

FIGS. 5A through 5D are views of various components of a light bar system for a steering wheel according to another implementation.

DETAILED DESCRIPTION

Various implementations disclosed herein include a light bar system for a steering wheel (or grip) of a vehicle. The light bar system includes a high intensity light source and a light diffusing layer disposed on a portion of the steering wheel. The light from the light source is diffused through the light diffusing layer, and the diffused light is emitted toward a driver or operator of the vehicle. For example, in certain implementations, the light bar system includes a plurality of high intensity light emitting diodes (LEDs) disposed behind an outer lens, and the light diffusing layer is a film disposed between an inner surface of the outer lens and the LEDs. In other implementations, the outer lens may diffuse light on its own or in combination with a light altering film. The light exiting the outer surface of the outer lens appears as a continuous stream of light across a length of the lens and provides sufficiently bright lighting to warn or communicate with the driver in various ambient lighting conditions. In certain implementations, the outer lens is colored to blend in with the rest of the steering wheel when the LEDs are not activated. The outer lens and/or one or more light altering films disposed between the outer lens and the LEDs prevent ambient light from entering the lens and illuminating the LEDs or components behind the lens, which reduces distractions and the potential for false warnings or unintended communications with the driver.

Figure 1:
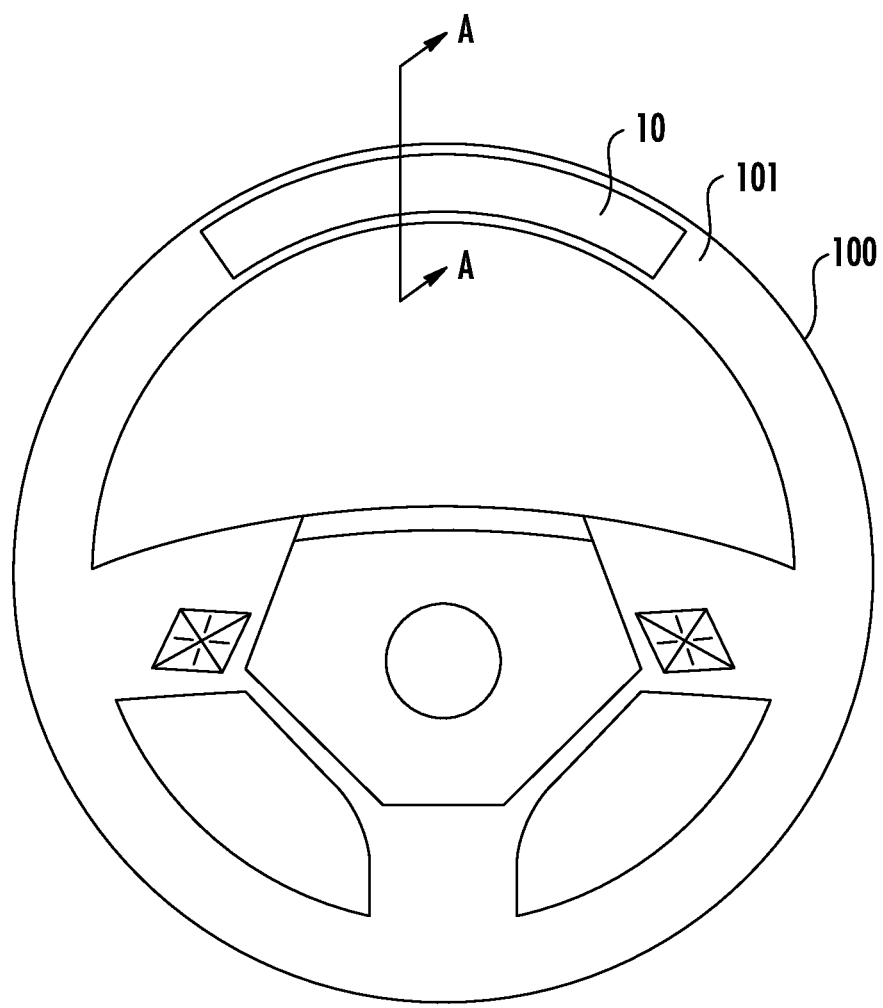
FIG. 1 is a perspective front view of the light bar system on a steering wheel according to one implementation.
Figure 2:
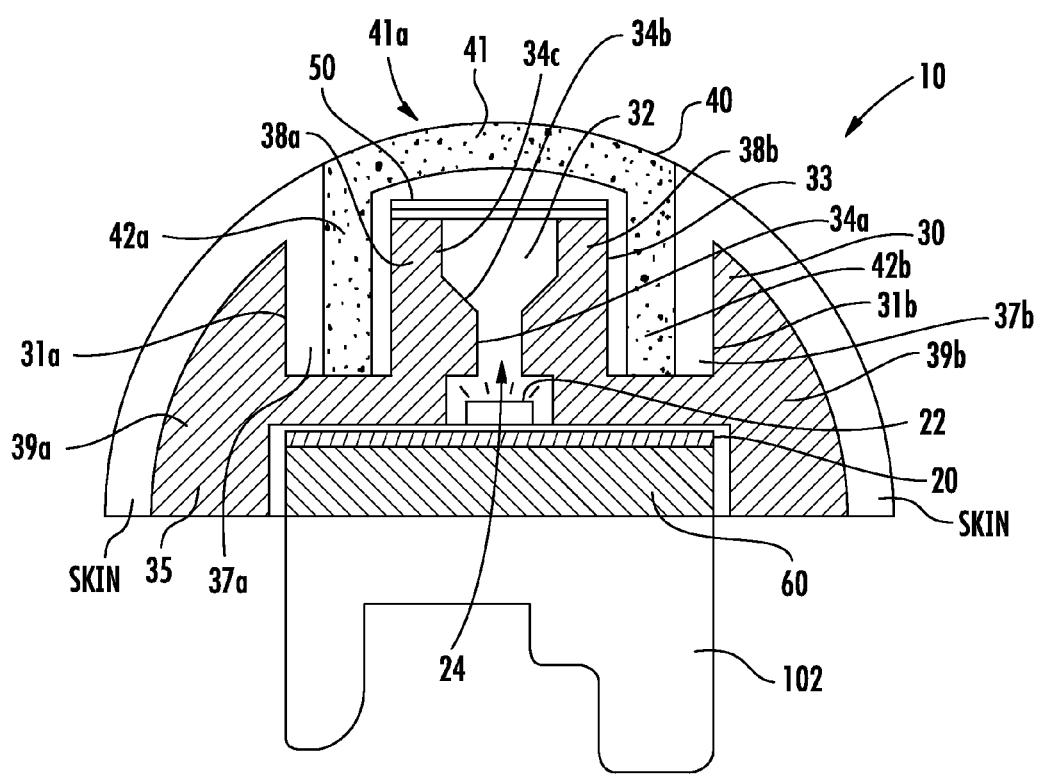
FIG. 2 is a cross-sectional view of the light bar system shown in FIG. 1 taken along the A-A line.

For example, FIGS. 1 through 4 and 13 and 14 illustrate various aspects of a light bar system 10 according to one implementation. As shown in FIG. 1, the light bar system 10 is disposed on a front surface 101 of a steering wheel 100, which is the surface that substantially faces a driver of the vehicle. FIG. 2 illustrates a cross-sectional view of the light bar system 10 along the A-A line in FIG. 1. As shown, the light bar system 10 includes a printed circuit board (PCB) 20 on which a plurality of light emitting diodes (LEDs) 22 are disposed, a carrier 30 that defines a light optimizing channel 32, one or more light altering films 50, an outer lens 40, and a heat transfer pad 60 disposed between the PCB 20 and a rim, or armature, 102 of the steering wheel 100.

Figure 3:
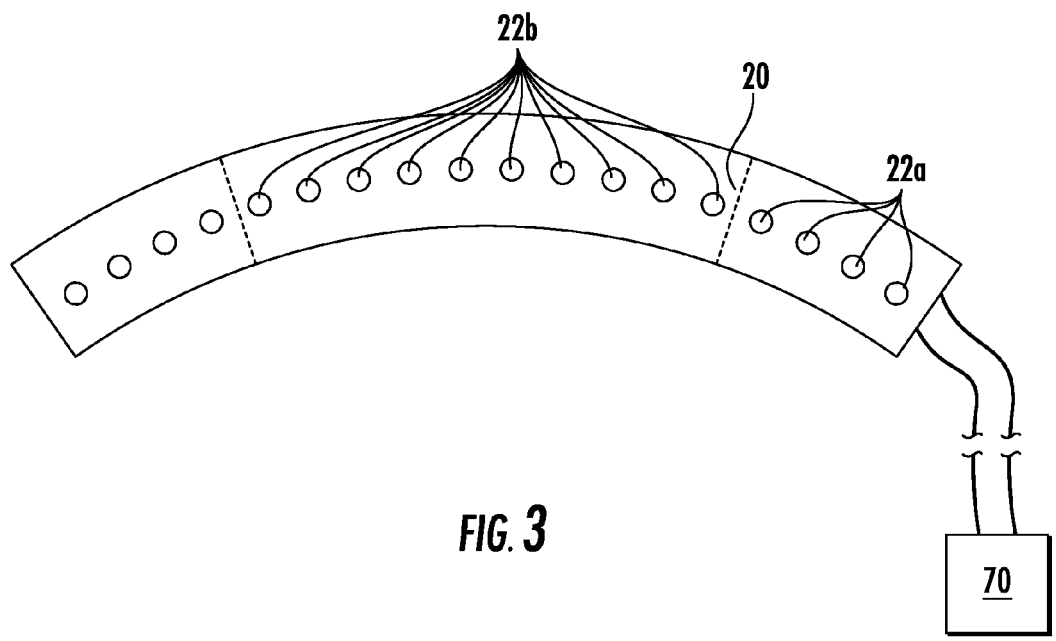
FIG. 3 is a front view of a printed circuit board with a plurality of light emitting diodes disposed thereon according to one implementation.

FIG. 3 illustrates a front view of the PCB 20 shown in FIG. 2 on which the plurality of LEDs 22 are disposed. In this implementation, the PCB 20 is substantially arcuate shaped to follow the shape of a portion of the front surface 101 of the steering wheel 100. The PCB 20 can include, for example, rigid, semi-rigid, and flexible-type PCBs. In particular, the PCB 20 may include a flex circuit wherein the LEDs 22 are mounted to a backing material that acts as a heat sink. The backing material can include, for example, an aluminum flex backing. Other types and combinations of PCBs are contemplated. The board material of an exemplary PCB 20 may be constructed of FR-4 (G-10) glass reinforced epoxy laminate. In addition, at least an upper surface of the PCB 20 on which the LEDs 22 are disposed may be colored or coated black or another dark color to prevent reflection of any ambient light that may pass through the lens 40.

As shown in FIGS. 2 and 5, the PCB 20 is held in place by a friction fit between the carrier 30 and the armature 102. However, in other implementations, the PCB 20 may be secured adjacent the armature 102 of the steering wheel 100 or carrier 30 using clips, snaps, screws, straps, glue, heat staking, or any other suitable fastening mechanisms. For example, in the implementation shown in FIG. 5A, the PCB is secured adjacent the armature using screws, and in the implementation shown in FIG. 12, the screws secure the PCB to a housing that is secured to the armature. Thus, the PCB may be secured adjacent the armature or adjacent the carrier or other adjacent components prior to being installed adjacent the armature. Various implementations of assembling the components of the described light bar systems to the steering wheel are described below in relation to FIGS. 15-17.

The LEDs 22 shown in FIG. 3 are top firing LEDs, but side firing LEDs may be used in other implementations, depending on the contemplated uses of the light bar system and the orientation of the light bar system 10 on the steering wheel 100. In addition, the LEDs may be one color, bi-color, tri-color, or multi-color LEDs, and the number of LEDs disposed on the PCB 20 may be selected based on the arc length of the PCB 20, light intensity desired, size of the steering wheel, and/or the design of the light bar system, according to various implementations. For example, in certain implementations, the PCB 20 may include around 30 to around 36 LEDs for an arc length equal to about 25% of the circumference of the steering wheel rim, around 50 LEDs for an arc length equal to about 50% of the circumference of the steering wheel rim, less than 30 LEDs for an arc length less than about 35% of the circumference of the steering wheel rim, and more than 50 LEDs for an arc length greater than about 50% of the circumference of the steering wheel rim. For example, in certain implementations, the LEDs 22 may be spaced apart from each other by about 4 to about 13 mm on center along the PCB 20, depending on how many LEDs 22 are included and the contemplated use of the light bar system 10. In other implementations, the PCB 20 may include between 10 and 15 LEDs for an arc length equal to about 15% to about 25% of the circumference of the steering wheel rim. For example, the PCB 20 may include 11 LEDs for an arc length equal to about 20% of the circumference of the steering wheel rim.

Furthermore, according to certain implementations, a portion of the LEDs 22, such as LEDs 22a shown in FIG. 3, may include infrared LEDs, and a portion of the LEDs 22, such as 22b shown in FIG. 3, may include visible LEDs. The infrared LEDs 22a may be used to illuminate the driver's face for cameras that are part of a driver monitoring system of the vehicle, for example. The visible LEDs 22b may have an intensity of about 24,000 nits.

The PCB 20 is in electrical communication with an electronic control unit (ECU) 70, as shown in FIG. 3. The ECU 70 selectively fires the LEDs 22 on the PCB 20 based on input from the driver assistance and/or safety system(s) of the vehicle (not shown). Various implementations of this functionality are described in co-pending U.S. patent application Ser. No. 14/061,383, filed Oct. 23, 2013, and published as U.S. Patent Publication No. 2014/0111324 on Apr. 24, 2014, which is herein incorporated by reference in its entirety.

Referring back to FIG. 2, the one or more light altering films 50 may include one or more layers of a brightness enhancing film, a light diffusing film, and/or a light turning film. The type(s) of film 50 included are selected to assist with diffusing, enhancing, and/or re-orienting or redirecting the light emitted from the LEDs 22 prior to the light passing through the outer lens 40. In addition, the films 50 may be helpful in preventing ambient light from illuminating the interior components of the system 10. Because the distance between the LEDs 22 and the lens 40 is relatively short, the films 50 are helpful in providing the desired effect of the light bar system 10 without adding unnecessary bulk to the steering wheel 100. These films may be selected based on the desired intensity level and effect. For example, the light diffusing film diffuses light passing there through, which causes the light from individual LEDs to appear as one continuous stream of light and prevents the appearance of "hot spots" from each individual LED. Brightness enhancing films may be used to increase the intensity of the light passing through the lens such that the light exiting the lens has an intensity range desired by consumers and/or manufacturers. These brightness enhancing films may be used to increase the intensity of light exiting a light diffusing film prior to passing through the outer lens or it may be used to increase the intensity of light from the LEDs prior to the light passing through the outer lens, which may be particularly useful when the lens is colored and/or translucent and blocks a portion of the light passing through it, according to some implementations. In addition, the intensity of the LEDs 22 may be reduced, which results in less current and less heat generation by the LEDs 22. To compensate for the reduction in intensity from the LEDs 22, brightness enhancing films may be disposed between the LEDs 22 and the outer lens 40 to increase the intensity of the light prior to the light exiting the lens 40.

Figure 4:
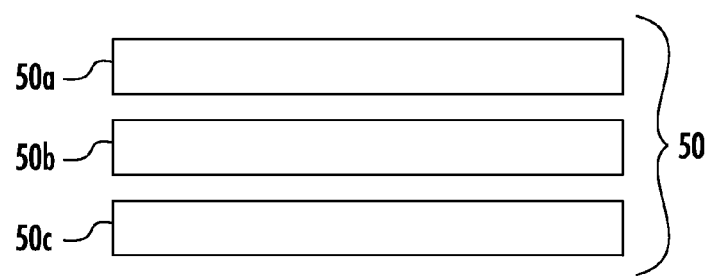
FIG. 4 is an exploded view of light altering films according to one implementation.
Figure 20:
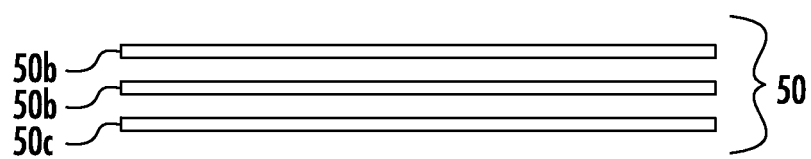
FIG. 20 illustrates a light altering film layering arrangement according to one implementation.

In the implementation shown in FIGS. 2 and 4, the film 50a is a light turning film, the film 50b is a brightness enhancing film, and the film 50c is a light diffusing film. Thus, the light from the LEDs 22 passes through the light diffusing film 50c, then the brightness enhancing film 50b, and then the light turning film 50a before passing through the outer lens 40. In certain implementations, one or more of the films 50 may redirect the light to a particular portion of the steering wheel where peak intensity is desired. In various other implementations, two or more layers of the same type of film may be included, one or more of the films 50 may be omitted, or all of the films 50 may be omitted, depending on the needs of the light bar system 10. For example, in the implementation shown in FIG. 20, the system 100 includes a light diffusing film 50c adjacent the LEDs 22 and two layers of a brightness enhancing film 50b between the light diffusing film 50c and the outer lens 40.

Figure 13:
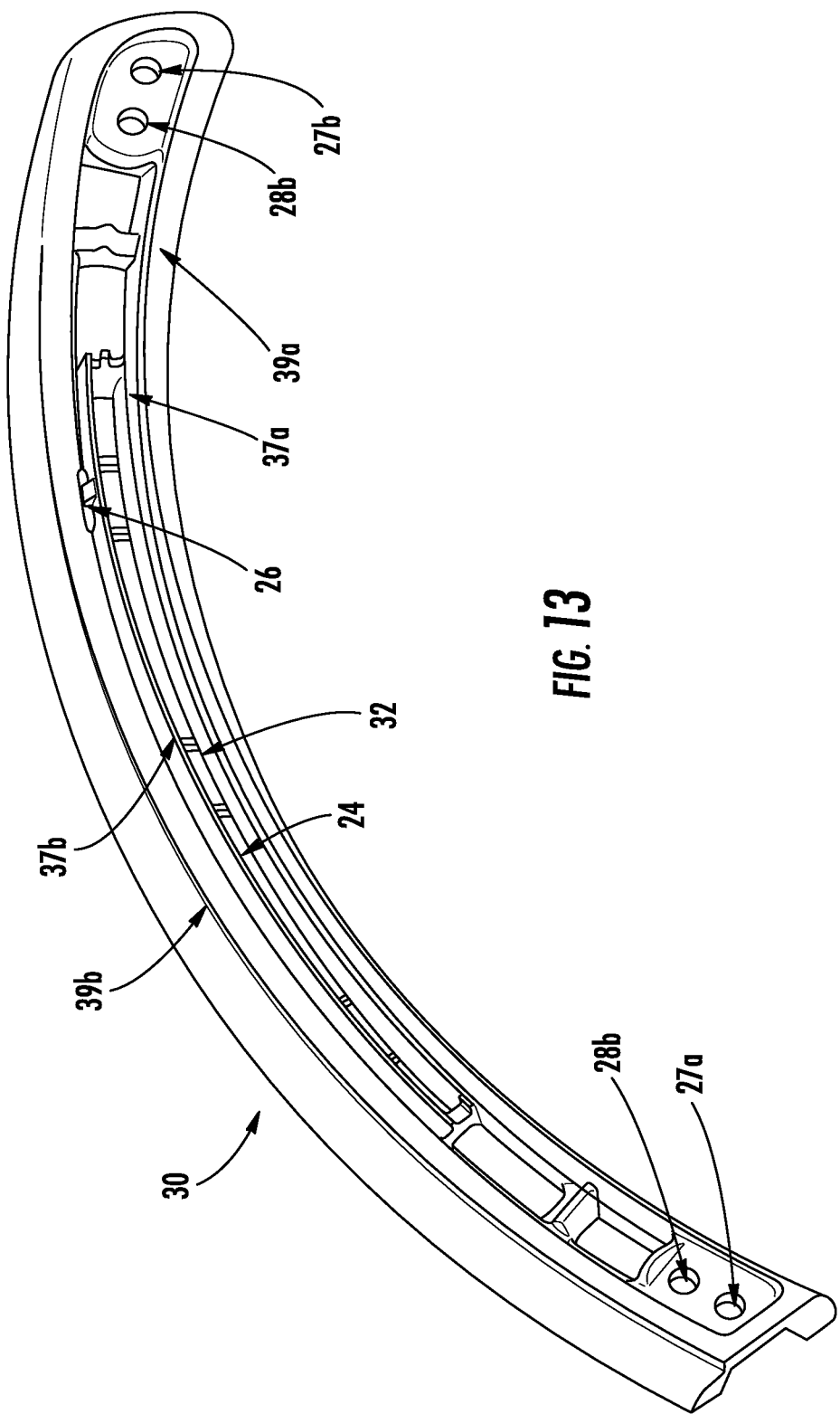
FIG. 13 is a perspective view of the carrier of the light bar system shown in FIG. 1.

In the implementation shown in FIGS. 2 and 13, the carrier 30 may be formed of a plastic or other rigid material and is disposed adjacent the PCB 20 and armature 102. As shown in FIG. 13, the length of the carrier 30 is substantially arcuate shaped to follow the shape of a portion of the front surface 101 of the steering wheel 100. As shown as FIG. 2, the carrier 30 includes a base portion 35, two inner side walls 38a, 38b that extend from the base portion 35 toward the front surface 101 of the steering wheel 100, and two outer side walls 39a, 39b that extend from the base portion 35 toward the front surface of the steering wheel and are spaced apart from the inner side walls 38a, 38b. An outer surface of inner side wall 38a and an inner surface 31a of outer side wall 39a define an external channel 37a there between, and an outer surface of inner side wall 38b and an inner surface 31b of outer side wall 39b define an external channel 37b there between.

The base 35 defines an arcuate shaped hole 24 that is disposed between the inner (or opposing) surfaces of the side walls 38a, 38b through which the LEDs 22 may extend, and the inner surfaces of the side walls 38a, 38b define a light optimizing channel 32. The light optimizing channel 32 extends from the base 35 toward the outer lens 40. Light emitted from the LEDs 22 travels through the light optimizing channel 32 toward the outer lens 40. The light optimizing channel 32 may have a reflective surface, which recycles the light from the LEDs 22 and prevents the light from being diffused prior to reaching a distal end 33 of the channel 32. The channel 32 shown in FIG. 2 includes a proximal portion 34a and a distal portion 34c that each have a substantially rectangular shaped cross-section (as taken through a plane that is perpendicular to the front 101 and rear surfaces of the steering grip and the direction of rotation of the steering wheel 100) and a central portion 34b that has a substantially trapezoidal shaped cross-section and extends between the proximal and distal portions 34a, 34c, respectively. The proximal portion 34a is disposed adjacent the PCB 20, and the distal portion 34c is disposed adjacent the distal end 33 of the channel 32. The width (as measured in the cross-sectional plane described above) of the distal portion 34c is greater than the width of the proximal portion 34a, and the width of the central portion 34b increases from a distal end of the proximal portion 34a to a proximal end of the distal portion 34c.

Figure 6:
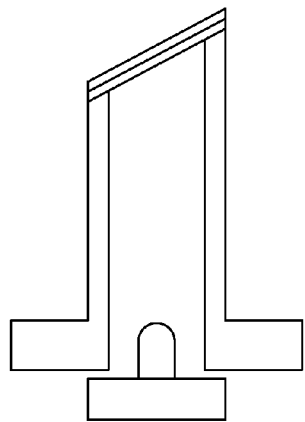
FIG. 6 is a straight light optimizing channel according to another implementation.
Figure 7:
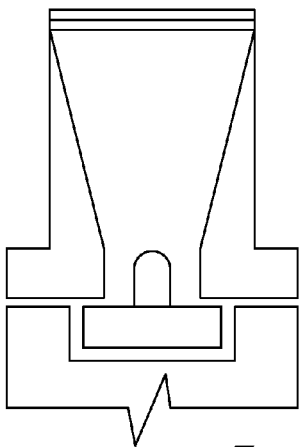
FIG. 7 is a tapered light optimizing channel according to another implementation.
Figure 8:
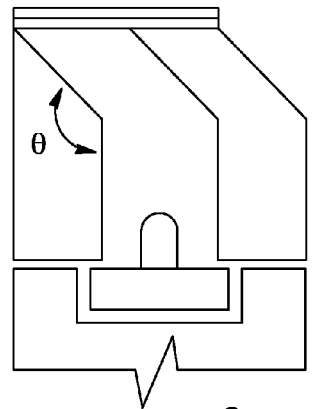
FIG. 8 is a bent light optimizing channel according to another implementation.

In other implementations, the light optimizing channel may be shaped differently. For example, in the implementation shown in FIG. 6, the channel has a substantially rectangular cross-section between the proximal and distal ends thereof. And, in the implementation as shown in FIG. 7, the channel has a substantially trapezoidal shaped cross section extending between the proximal and distal ends thereof. Furthermore, as shown in the implementation shown in FIG. 8, the channel has two portions that each have a substantially rectangular cross-section of the same width but are oriented at an angle θ greater than 0° relative to each other. Other implementations may include alternative suitable shapes depending on the contemplated use of the light bar system and the orientation of the system on the steering wheel. Furthermore, a height of one side of the channel, as measured between the proximal and distal ends of the channel, may be greater than a height of the other side of the channel, which may be useful in directing light toward the shorter side of the channel. The implementations in FIGS. 2 and 6 include this arrangement, for example. However, in other implementations, such as those shown in FIGS. 7 and 8, the height of each side of the channel may be substantially the same. For example, in some implementations, the height of each side of the channel is about 7 to about 10 mm.

In the implementation shown in FIG. 2, the inner surfaces of the side walls 38a, 38b that define the channel 32 may be coated or treated with a reflective material, such as a white or metallic paint, a reflective film, or aluminum (or other type of metal) plating, to direct the light from the LEDs 22 toward the outer lens 40. However, in other implementations, the side walls that define the light optimizing channel may be formed from other suitable reflective materials.

The carrier 30 may be disposed adjacent the armature 102 using various fastening mechanisms, such as screws, clips or snaps, straps, adhesive, or other suitable mechanisms. In the implementation shown in FIGS. 2 and 13, the carrier 30 is screwed adjacent the armature 102. In particular, the base 35 of the carrier 30 defines a hole 28a, 28b at each end thereof. The hole 28a, 28b is configured for receiving a screw (not shown) for securing the carrier 30 adjacent the armature 102. FIGS. 5A-5D and FIGS. 18A-18F, which are described below, illustrate other implementations in which the carrier is clipped or snapped to the armature.

Figure 18B:
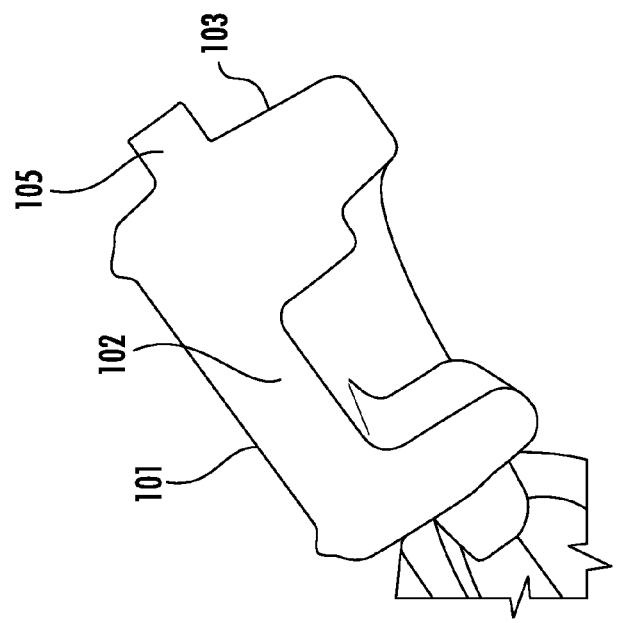
FIG. 18B illustrates a cross sectional view of the armature shown in FIG. 18A as viewed through the G-G line.
Figure 18A:
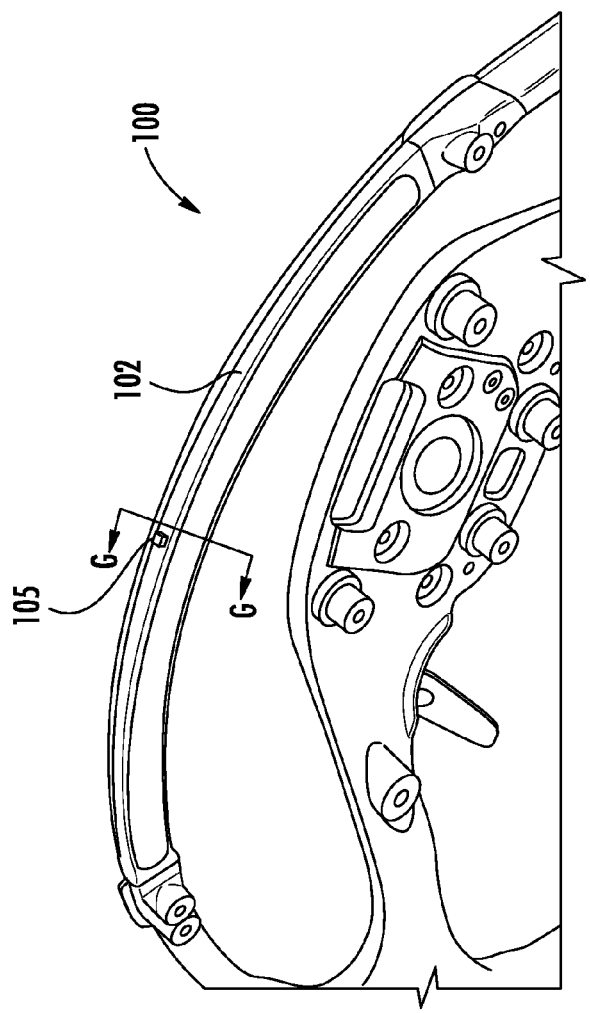
FIG. 18A illustrates an armature having a protrusion for being received into a clip opening to couple a carrier to the armature according to one implementation.
Figure 18C:
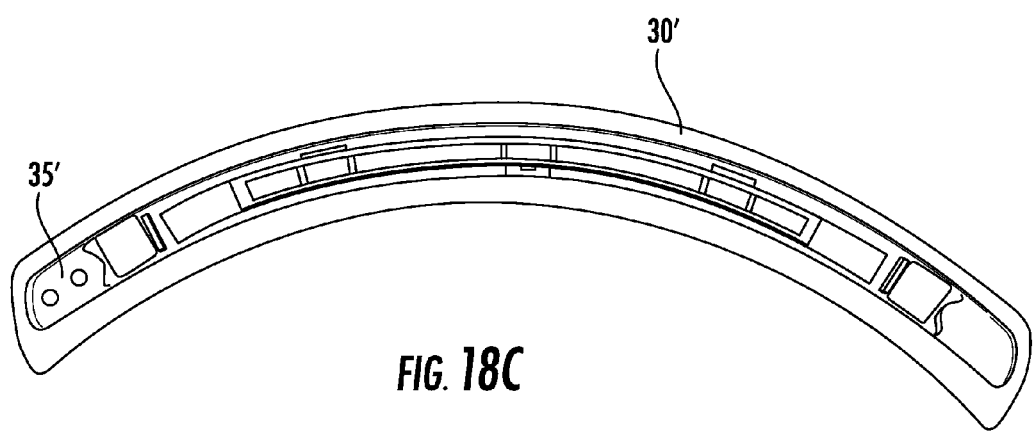
FIG. 18C illustrates a front perspective view of a carrier for coupling to the protrusion shown in FIGS. 18A and 18B, according to one implementation.
Figure 18D:
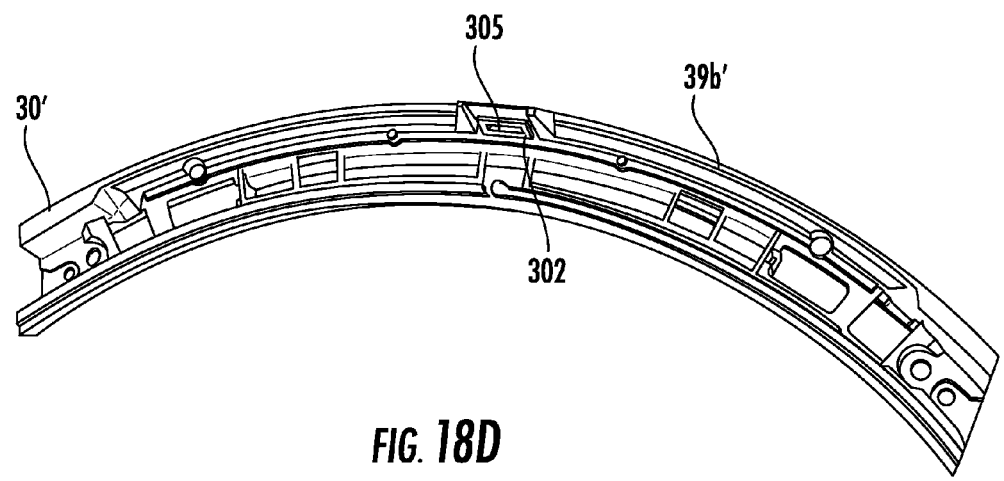
FIG. 18D illustrates a rear perspective view of the carrier shown in FIG. 18C.
Figure 18E:
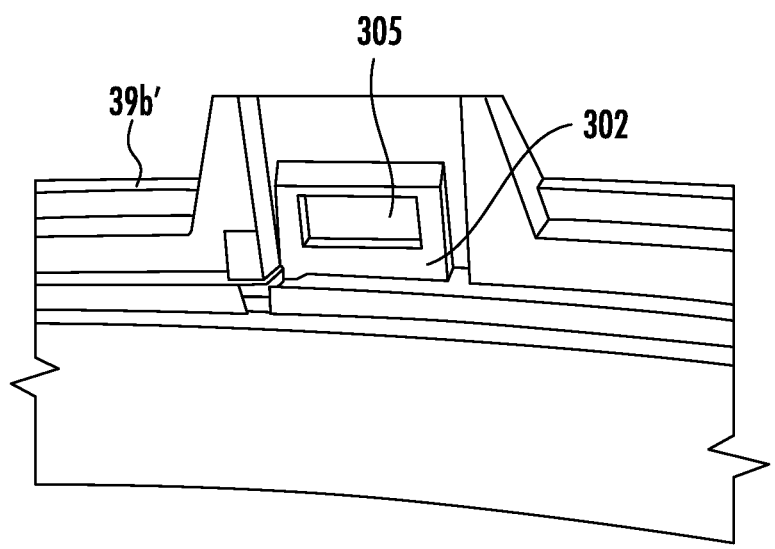
FIG. 18E illustrates a front view of a clip of the carrier shown in FIG. 18C.
Figure 18F:
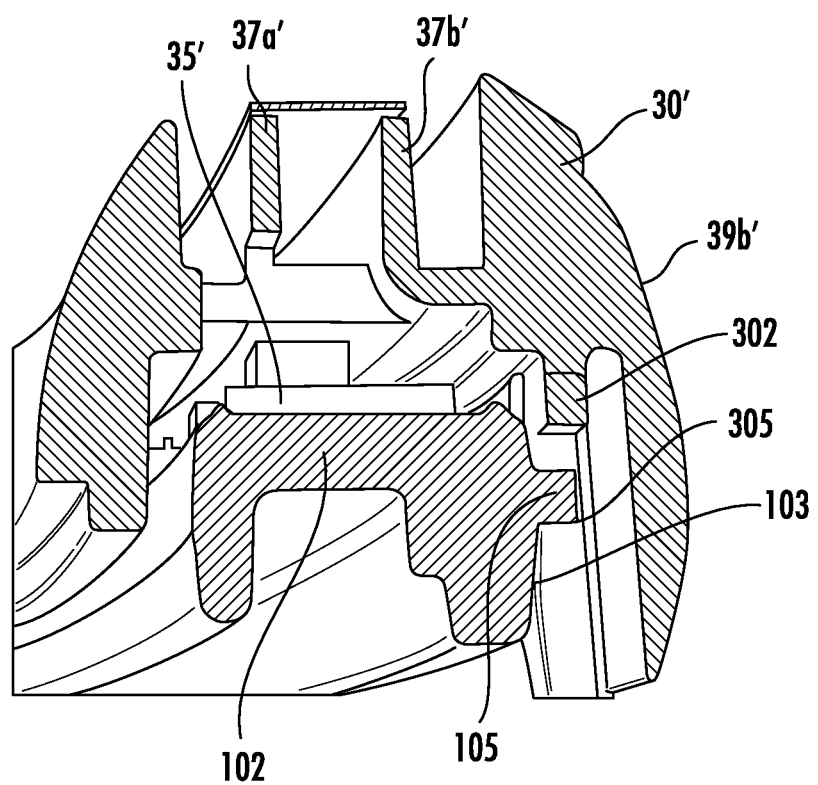
FIG. 18F illustrates the carrier shown in FIG. 18C coupled to the armature shown in FIG. 18A.

FIGS. 18A through 18F illustrate an implementation of carrier 30' in which the carrier 30' is secured to the armature 102 using a snap fit arrangement. In particular, as shown in FIGS. 18A and 18B, at least one protrusion 105 extends from an upper surface 103 of the armature 102. FIG. 18B illustrates a cross sectional view of the armature 102 shown in FIG. 18A as taken through the G-G line. In the example shown in FIG. 18, the protrusion 105 is disposed at the 12 o'clock position on the steering wheel 100 and extends upwardly from the upper surface 103 of the armature. The carrier 30' includes at least one tab 302 that extends from the base 35' in a direction opposite inner side walls 37a', 37b'. The tab 302 is disposed inwardly of and spaced apart from the outer side wall 39b' of the carrier 30'. The tab 302 defines an opening 305 that receives the protrusion 105 when the carrier 30' is disposed on the armature 102 in the intended position. By engaging the protrusion 105 into the opening 305, the carrier 30' is prevented from moving relative to the armature 102. In other implementations (not shown), the tab 302 may define a depression for receiving the protrusion, the tab 302 may be part of an inner side wall that extends from the base 35', and/or the opening 305 or depression may be defined in the outer wall 39b', which negates the need for a separately formed clip 302. And, in other implementations, the protrusion may extend from the side wall of the carrier and the opening or depression for receiving the protrusion may be defined in the armature. Furthermore, in other implementations, there may be more than one protrusion and opening or depression and/or the protrusion may be disposed at a different location on the steering wheel 100.

The outer lens 40 shown in FIG. 2 includes a distal end 41 through which light enters and exits the lens 40 and side portions 42a, 42b that extend toward the other components of the light bar system 10. For example, the lens 40 is substantially U-shaped as viewed in the cross-section taken through the A-A line of FIG. 1, and the distal end 41 is disposed between side portions 42a, 42b.

The distal end 41 may be partially opaque in certain implementations to mask light from exiting from a portion of the lens 40. The remaining portions of the lens 40 may be translucent and/or colored similarly to the masked portion to block at least a portion of the light from the LEDs 22 and prevent at least a portion of ambient light from entering the lens 40 to keep the components behind the lens 40 hidden from view. By coloring the various portions of the lens 40 similarly, the lens appears as one trim piece and is more aesthetically pleasing. In addition, by coloring the lens 40 similarly to the steering apparatus, the lens 40 is not distracting to the driver except when light is passing through the lens toward the driver. According to certain implementations, the lens 40 is configured to block at least 90% of the light that enters the lens. Furthermore, in some implementations, the lens 40 and the light diffusing film may work together to diffuse light passing there through to cause the light from individual LEDs to appear as one continuous stream of light and prevents the appearance of "hot spots" from each individual LED. In addition, the lens 40 and the light diffusing film may work together to prevent ambient light from illuminating the interior components of the system.

As shown in FIG. 2, an outer surface 41a of the distal end 41 follows a substantially arcuate path as viewed along the A-A line in FIG. 1 such that the outer surface 41a follows the contour of an outer, front surface 101 of the steering wheel 100. This shaping also allows the lens 40 to blend in with the steering wheel 100 when the LEDs 22 are not excited by the ECU 70, which may be more aesthetically and ergonomically pleasing to the driver. In addition, as shown in FIG. 1, a length of the outer surface 41a of the distal end 41 of the lens 40 follows another substantially arcuate path along a length of the front surface 101 of the steering wheel 100.

The lens 40 may be formed of polycarbonate, acrylic, perforated aluminum, a resin, or other suitable materials. For example, the lens 40 may be formed of a resin or other material having light diffusing properties in some implementations. For example, in certain implementations in which the lens is formed with material having light diffusing properties, the lens may be used with or without the light diffusing film. In addition, the lens 40, or at least the outer surface 41a of the distal end 41 thereof, may be dyed or painted to match the steering wheel color, such as dyed or painted brown or black. By darkening at least the outer surface 41a of the distal end 41 of the outer lens 40, the intensity of the light from the LEDs 22 is reduced to a desired light intensity level. For example, a vehicle manufacturer or consumer may prefer to have the light intensity level of the light exiting the lens 40 be between about 500 and about 550 nits for daytime driving and about 5 nits to about 50 nits during nighttime or low lighting driving conditions. To achieve the desired light intensity levels with a dark colored or translucent outer lens, the LEDs 22 may be illuminated at a relatively high intensity level, such as around 24,000 nits, to provide sufficient light to be diffused by one or more light diffusing films or the outer lens 40, according to certain implementations. In alternative implementations, the lens may be clear, and one or more light diffusing films 50c may be disposed between the outer lens 40 and the LEDs 22. Furthermore, the lens 40 and/or the light diffusing films 50c may be configured to block at least about 90% of the light.

In addition, according to certain implementations, a portion of the lens 40 may be configured to mask, or shape, the light exiting the lens 40. For example, a light blocking paint, dye, or film may be disposed on the inner surface of the lens to block visible light from passing through the light blocking paint, dye, or film. For example, the light blocking portion of the lens 40 may be black or brown. This light blocking portion may be disposed above infrared LEDs 22a on the PCB 20, for example, or along other portions of the light bar system.

In addition, in some implementations, the lens 40 may be formed using in-mold labeling (IML) techniques. For example, a film may be printed with ink that masks light from passing therethrough, and this film is disposed in a lens mold prior to filling the mold with resin or other lens-forming material to create the lens. When the lens forming material is set, the film is cured and integrated with the lens forming material and becomes the distal outer surface of the lens 40.

Figure 14:
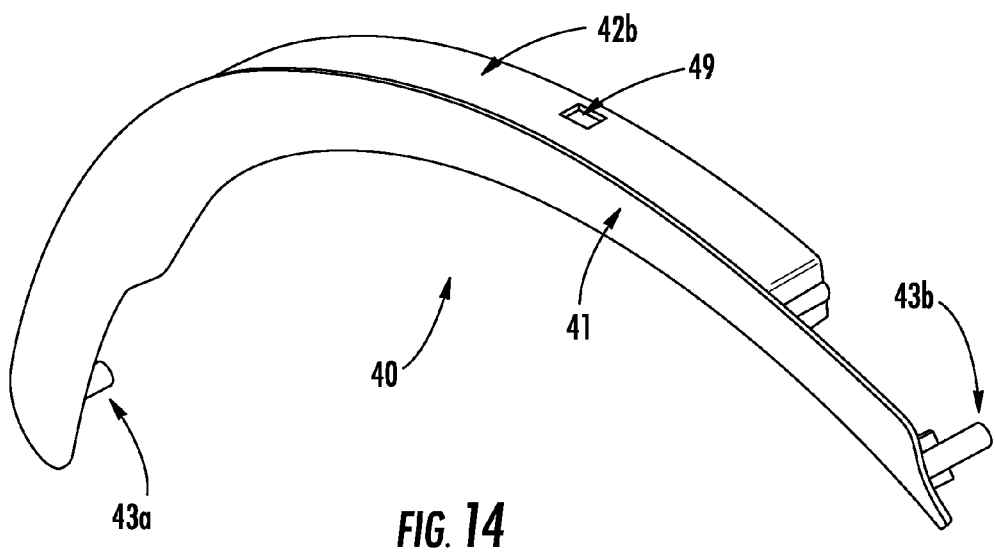
FIG. 14 is a perspective view of the lens of the light bar system shown in FIG. 1.

The lens 40 may be held in place adjacent the carrier 30 via a friction fit or it may be fastened in place, such as using screws, clips, glue, straps, or other suitable fastening mechanisms. For example, as shown in FIG. 2, the side portions 42a, 42b of the lens 40 extend into the external channels 37a, 37b, respectively, and may be fastened within the respective channel 37a, 37b by using a clip, or snap, mechanism. In particular, as shown in FIGS. 13 and 14, the carrier 30 further includes at least one protrusion 26 that extends from the outer surface of each inner side wall 38a, 38b of the carrier 30 into the channel 37a, 37b, respectively. Each side portion 42a, 42b of the lens 40 defines at least one recess or aperture 49 for receiving the respective protrusion 26 when the lens 40 is disposed adjacent the carrier 30. The engagement of the protrusions 26 into the recesses or apertures 49 prevents movement of the lens 40 relative to the carrier 30. In addition, as shown in FIG. 13, the base 35 of the carrier defines a post hole 27a, 27b at each end that is configured for receiving post 43a, 43b, respectively, that extend downwardly from the distal end 41 of the lens 40 adjacent each end (along the length thereof) of the lens 40. When the posts 43a, 43b are aligned with and engage the post holes 27a, 27b of the carrier 30, the protrusions 26 and recesses or apertures 49 for securing the lens 40 to the carrier 30 are aligned and able to engage.

Figure 19A:
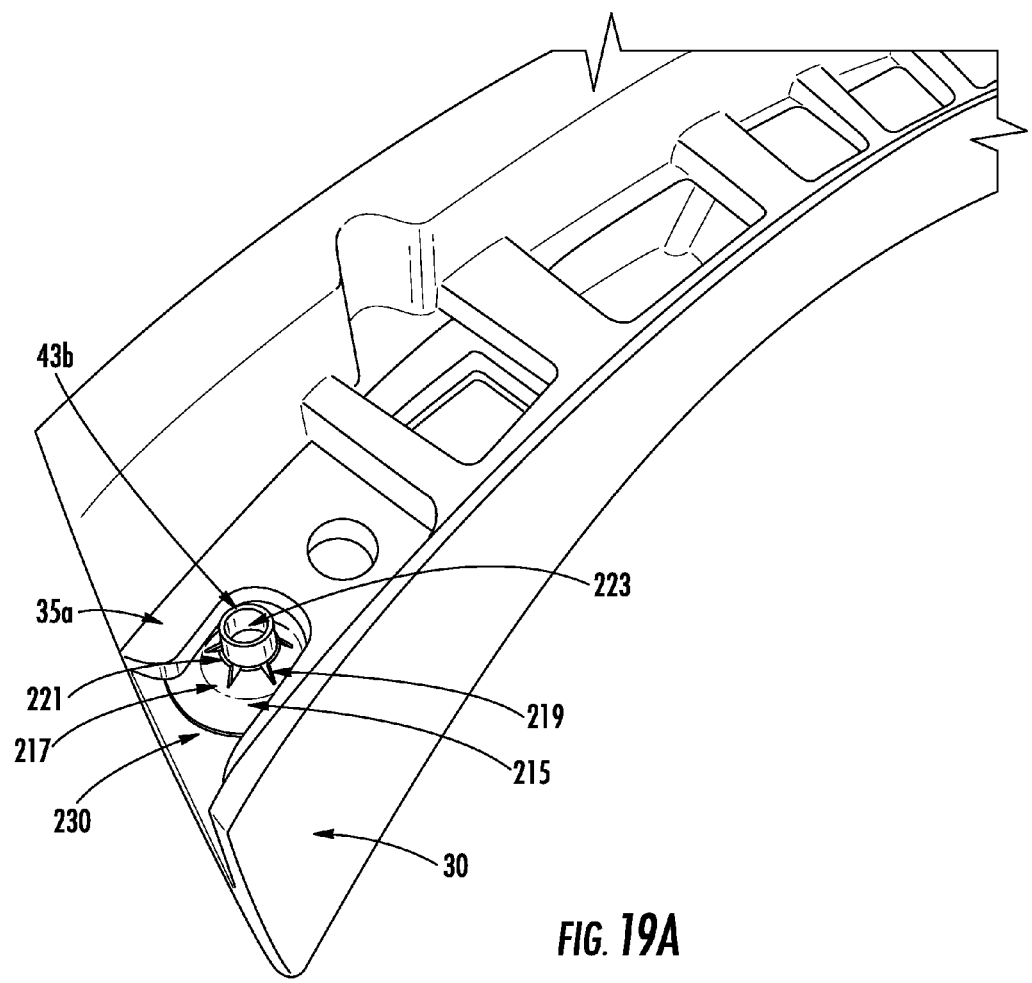
FIG. 19A illustrates a perspective view of a push nut for coupling the lens with the carrier according to one implementation.
Figure 19B:
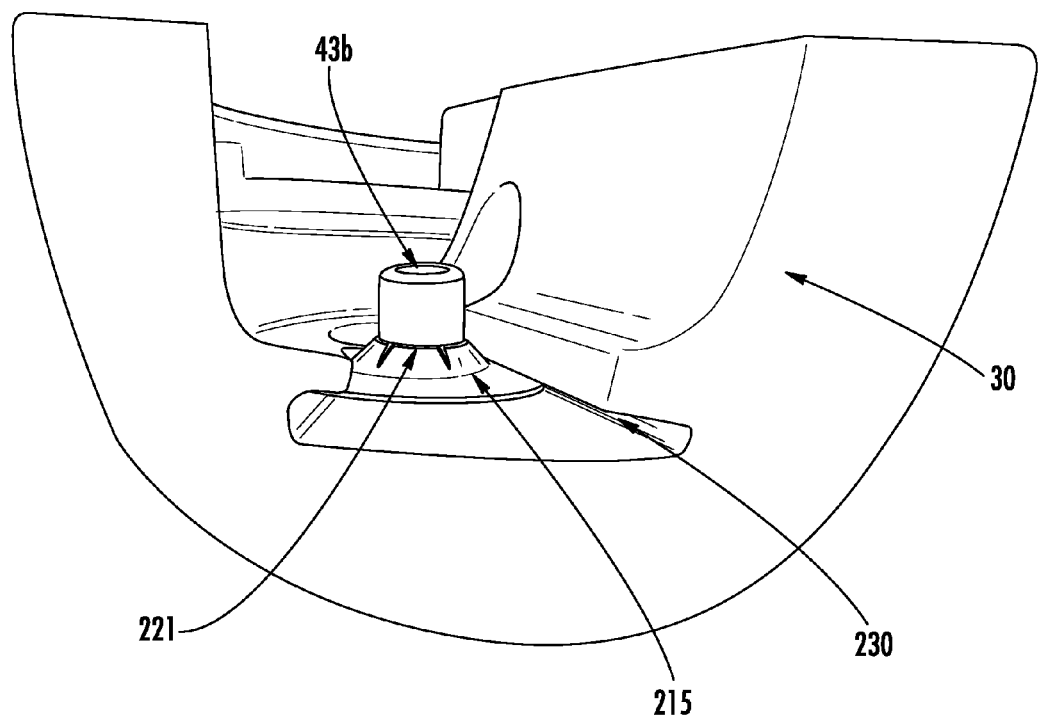
FIG. 19B illustrates a side view of the push nut shown in FIG. 19A.

In a further implementation shown in FIGS. 19A and 19B, one or more push nuts 215 may be used to prevent the posts 43a, 43b from moving axially away from the carrier 30 out of post holes 27a, 27b. In particular, each push nut 215 includes an annular shaped base 217 and a plurality of leaves 219 that extend axially away and radially inwardly from the base 217. Each leaf 219 includes a proximal end that is integrally formed with the base 217 and distal end 221 that extends axially away from the base 217. The distal ends 221 are separated from each other, are biased in a radially inward direction toward each other, and define an aperture 223.

A lower surface 35a of the base 35 of the carrier 30 defines a slot 230 adjacent each post hole 27a, 27b. The base 217 of push nut 215 is slidably engaged into the slot 230 such that the aperture 223 of the push nut 215 is axially aligned with a respective post hole 27a, 27b and the distal ends 221 extend away from the lower surface 35a. Respective posts 43a, 43b of the lens 40 are engaged through the post holes 27a, 27b and then through aperture 223 of the respective push nut 215 adjacent the post hole 27a, 27b. The radially inwardly biased leaves 219 prevent the posts 43a, 43b from being pulled out of the post holes 27a, 27b in a direction away from the carrier 30.

Alternatively, the protrusions may extend from the inner or outer surface of the side portions 42a, 42b of the lens 40, and a corresponding surface within the external channels 37a, 37b of the carrier 30 may define the recesses or apertures configured for receiving the protrusions. And in yet another alternative implementation (not shown), one or more legs extend from the lower edge of the side portions of the lens, and each leg includes a protrusion that extends outwardly (or inwardly) toward the side walls 38a, 38b or 39a, 39b of the carrier 30. The carrier 30 defines a corresponding aperture or recess in the base 35 adjacent each external channel 37a, 37b, for receiving each protrusion.

Alternatively or in addition to one or more of the fastening methods mentioned above, the side portions 42a, 42b may be held in the channel 37a, 37b via a friction fit by tucking edges of the outer skin of the steering wheel 100 into the channels 37a, 37b adjacent the side portions 42a, 42b.

The heat transfer pad 60 is disposed between the PCB 20 and the steering wheel armature 102 and is configured for dissipating heat generated by the LEDs 22 on the PCB 20 to the armature 102, which is made of a metallic material and acts as a heat sink. The heat transfer pad 60 is separately formed from the carrier 30 in the implementation shown in FIG. 2 and may be formed of a thermally conductive resin, a thermally conductive epoxy, a thermally conductive polymer, a thermally conductive silicone, a thermally conductive adhesive, a thermal pad, a graphite film, and/or a metal. Alternatively (not shown), the heat transfer pad may be integrally formed in at least a portion of a polymeric foam molded layer that is disposed between the armature and the PCB. In such an implementation, at least the portion of the polymeric foam molded layer that is disposed between the PCB 20 and the armature 102 includes a heat conductive material, such as the materials mentioned above, or other suitable thermally conductive material, within the polymeric foam molded layer, and this material dissipates the heat from the PCB 20 to the armature 102. In addition, in certain implementations, the heat transfer pad 60 is compressible, which allows for greater mechanical build tolerances during assembly of the light bar system 10 onto the armature 102.

Figure 5D:
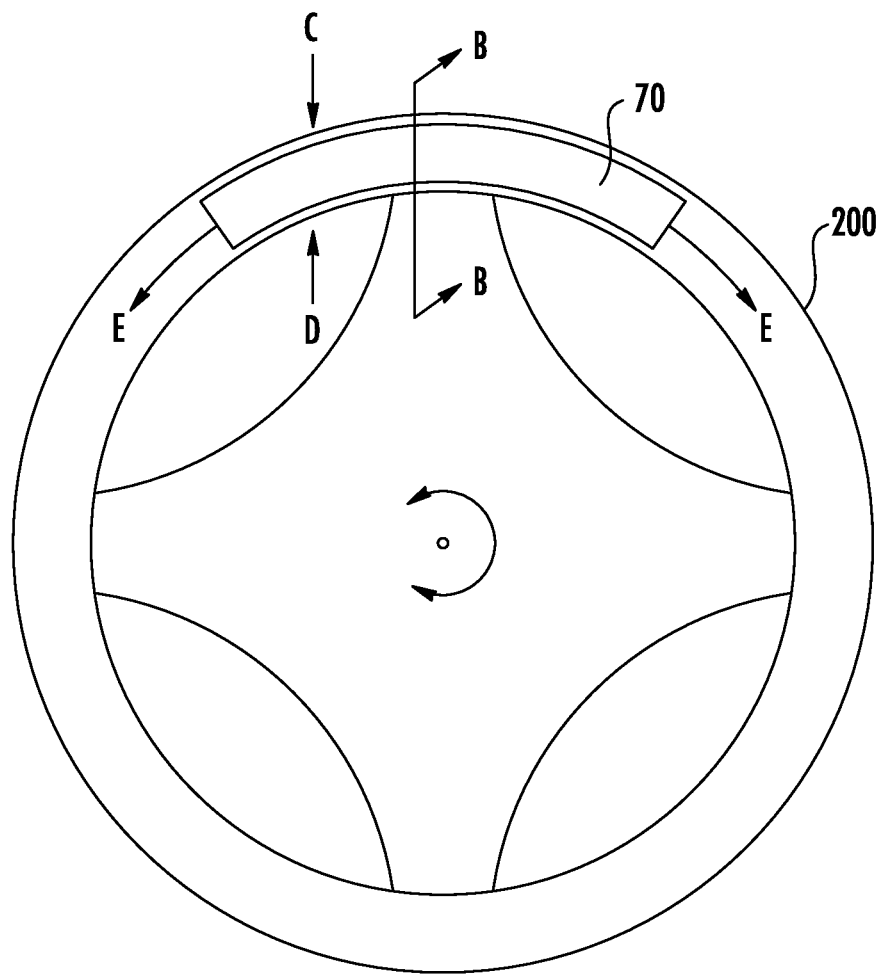

FIG. 5A illustrates another implementation of light bar system 70 in which the carrier 80 clips or snaps adjacent the armature 202. FIGS. 5B and 5C illustrate side views of each side of the armature 202 of the steering wheel 200 as viewed in the C direction and the D direction, respectively, shown in FIG. 5D. Carrier 80 and armature 202 may be clipped together to secure the carrier 80 adjacent the armature 202. In particular, the armature 202 includes a central mounting surface 203 that substantially faces in the direction of the front of the steering wheel 200 and side surfaces 204, 205 that extend away from the mounting surface 203 toward the rear surface of the steering wheel 200 (or in the direction away from the driver or operator). Heat transfer pad 75 and PCB 92 with LEDs 93 are disposed adjacent the central, mounting surface 203.

The carrier 80 includes a base 85 that includes a lower surface 85a that is disposed adjacent the polymeric foam molded layer 95 and the PCB 92 and outer side walls 84a, 84b that extend from the base 85 toward the front surface of the steering wheel 200. Outer surfaces of the outer side walls 84a, 84b follow the contour of the steering wheel 200 such that the outer covering (or skin) of the steering wheel 200 may be wrapped around the outer surfaces of the outer side walls 84a, 84b. Inner side walls 82a, 82b extend from the base 85 and are disposed inwardly of and spaced apart from the outer side walls 84a, 84b. Inner surfaces of inner side walls 82a, 82b define the light optimizing channel, and outer surfaces of the inner side walls 82a, 82b and inner surfaces of the outer side walls 84a, 84b define parallel external channels. The side portions 42a, 42b of the lens 40 and each edge of the skin may be tucked within the respective external channels to secure the skin and lens 40 relative to the steering wheel 200.

Each side surface 204, 205 of the armature 202 defines at least one recess 206, and the recesses 206 are spaced apart axially along the length of each side surface 204, 205 as shown in FIGS. 5B and 5C. In addition, as shown in FIGS. 5B and 5C, the recesses 206 defined on side surface 204 are not aligned with the recesses 206 on side surface 205 along the arc E that follows the shape of the steering wheel 200 in the plane of its axis of rotation, as shown in FIGS. 5B through 5D. Thus, FIG. 5A only shows recess 206 on side surface 205 because the cross-section shown in FIG. 5A is taken through the B-B line shown in FIGS. 5B through 5D. However, in other implementations, the recesses on each side surface of the armature may be aligned along the arc following the shape of the steering wheel in the plane of its axis of rotation, or the recesses may include one continuous recess along a portion of each side surface of the armature.

At least one leg 86 extends from each side of the lower surface 85a of the carrier 80 in a direction away from the front surface of the steering wheel 200. An inner surface of each leg 86 is disposed adjacent to and is biased toward a respective side surface 204, 205 of the armature, and a distal end of each leg 86 defines a protrusion 88 that extends inwardly toward the respective side surface 204, 205 and engages the recess 206 when the lower surface 85a of the base 85 of the carrier 80 is disposed adjacent the polymeric foam molded layer 95 and the PCB 92.

In addition, other implementations may include a clip mechanism (not shown) in which one or more side surfaces of the armature each define one or more protrusions that extend outwardly from the respective side surface, and the legs of the carrier define one or more recesses configured for receiving the protrusions when the carrier is disposed adjacent the armature. Furthermore, in other alternative implementations, other fastening mechanisms for securing the carrier adjacent the armature or polymeric foam molded layer may be used, such as other types of clip mechanisms, snaps, screws, straps, adhesives, and/or heat staking. In the above described implementations, the PCB is disposed adjacent a heat transfer pad that is disposed directly adjacent the armature of the steering wheel.

Figure 11:
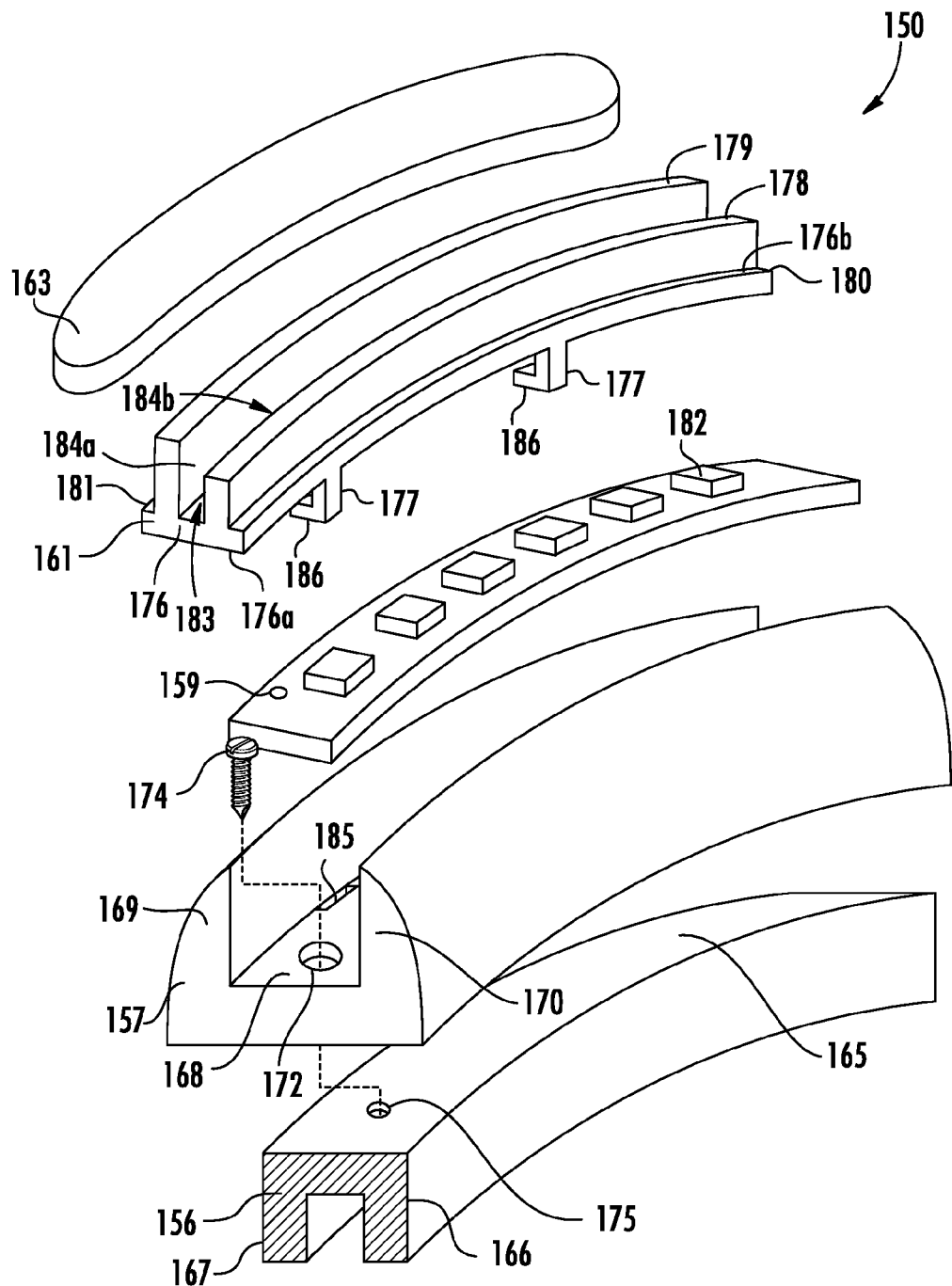
FIG. 11 is an exploded, perspective view of the light bar system on a steering wheel according to another implementation.

In other various implementations, the carrier defining the light optimizing channel may be separately formed from a housing that defines the outer side walls. For example, FIG. 11 illustrates a light bar system 150 according to one such implementation. In particular, the housing 157 and carrier 161 may be formed separately from a plastic or other rigid material. PCB 159 and carrier 161 defining the light optimizing channel are disposed within the separately formed housing 157, and the housing 157 is disposed adjacent the armature 155. The armature 155 may be similar to the implementations described above and includes a mounting surface 165 that faces the direction of the front surface of the steering wheel and side walls 166, 167 that extend from the mounting surface 165 in a direction away from the front surface of the steering wheel. The housing 157 includes a base 168 that is disposed adjacent the mounting surface 165 and side walls 169, 170 that extend from the base 168 toward the front surface of the steering wheel. Outer surfaces of the side walls 169, 170 are arcuate shaped to follow the contour of the front surface of the steering wheel, and the skin may be wrapped around the outer surfaces of the side walls 169, 170. Inner surfaces of the side walls 169, 170 and the base 168 of the housing 157 define a substantially U-shaped channel.

To secure the housing 157 adjacent the armature 155, the base 168 of the housing 157 defines one or more apertures 172 configured for receiving a screw 174 there through. One or more apertures 175 defined through the mounting surface 165 of the armature 155 align with the apertures 172 such that the screw 174 may be engaged through the apertures 172, 175 to secure the housing 157 to the armature 155. However, in other implementations, the housing 157 may be secured adjacent the armature 155 using a friction fit or other suitable fastening mechanisms, such as a clip mechanism, such as is described above in relation to FIGS. 5A-5D, straps, adhesives, and/or heat staking, for example.

The carrier 161 includes a base 176, one or more legs 177 that extend from a lower surface 176a of the base 176 in a direction toward the housing 157 (or away from the front surface of the steering wheel), and side walls 178, 179 that extend from an upper surface 176b of the base 176 in a direction toward the front surface of the steering wheel. The side walls 178, 179 are disposed inwardly of respective side edges 180, 181 of the base 176. The base 176 also defines an aperture 183 through which LEDs 182 disposed on the PCB 159 extend. The base 176 and inner surfaces 184a, 184b of the side walls 178, 179, respectively, define a light optimizing channel through which light from the LEDs 182 travels toward the lens 163.

The carrier 161 and the PCB 159 are disposed within the U-shaped channel of the housing 157 such that the PCB 159 is disposed between the base 168 of the housing and the lower surface 176a of the base 176 of the carrier 161. To secure the carrier 161 adjacent the housing 157, the legs 177 of the carrier 161 are clipped, or snapped, into a portion of the housing 157. In the implementation shown in FIG. 11, the legs 177 include a distal end 186 that is bent inwardly. The base 168 of the housing 157 defines recesses or apertures 185 through which the distal end 186 of the legs 177 may extend and engage the housing 157 to prevent movement of the carrier 161 relative to the housing 157. However, in other implementations, the distal end may be bent outwardly or may define a protrusion configured for engaging the recess or aperture. And, in other implementations (not shown), the side walls 169, 170 of the housing 157 may define the recesses or apertures. Furthermore, in other implementations, protrusions defined by the inner surfaces of the side walls 169, 170 of the housing 157 may extend into the U-shaped channel, and these protrusions are configured to engage the upper surface 176b of the base 176 of the carrier 161 adjacent edges 180, 181.

The PCB 159 is disposed adjacent the base 168 of the housing 157 between the inner surfaces of side walls 169, 170. The PCB 159 is held between the base 168 of the housing 157 and the lower surface 176a of the base 176 of the carrier 161 by a friction fit. However, in other implementations, other fastening mechanisms, such as those described above, may be used.

In addition, when the carrier is disposed within the U-shaped channel of the housing 157, the outer surface of side wall 179 of the carrier 161 and the inner surface of outer walls 169 of the housing 157 define a first external channel, and the outer surface of side wall 178 of the carrier 161 and the inner surface of the outer wall 170 of the housing 157 define a second external channel. The external channels are configured for receiving the skin of the steering wheel and the side portions of the lens 163, such as is described above in relation to FIG. 2.

Figure 12:
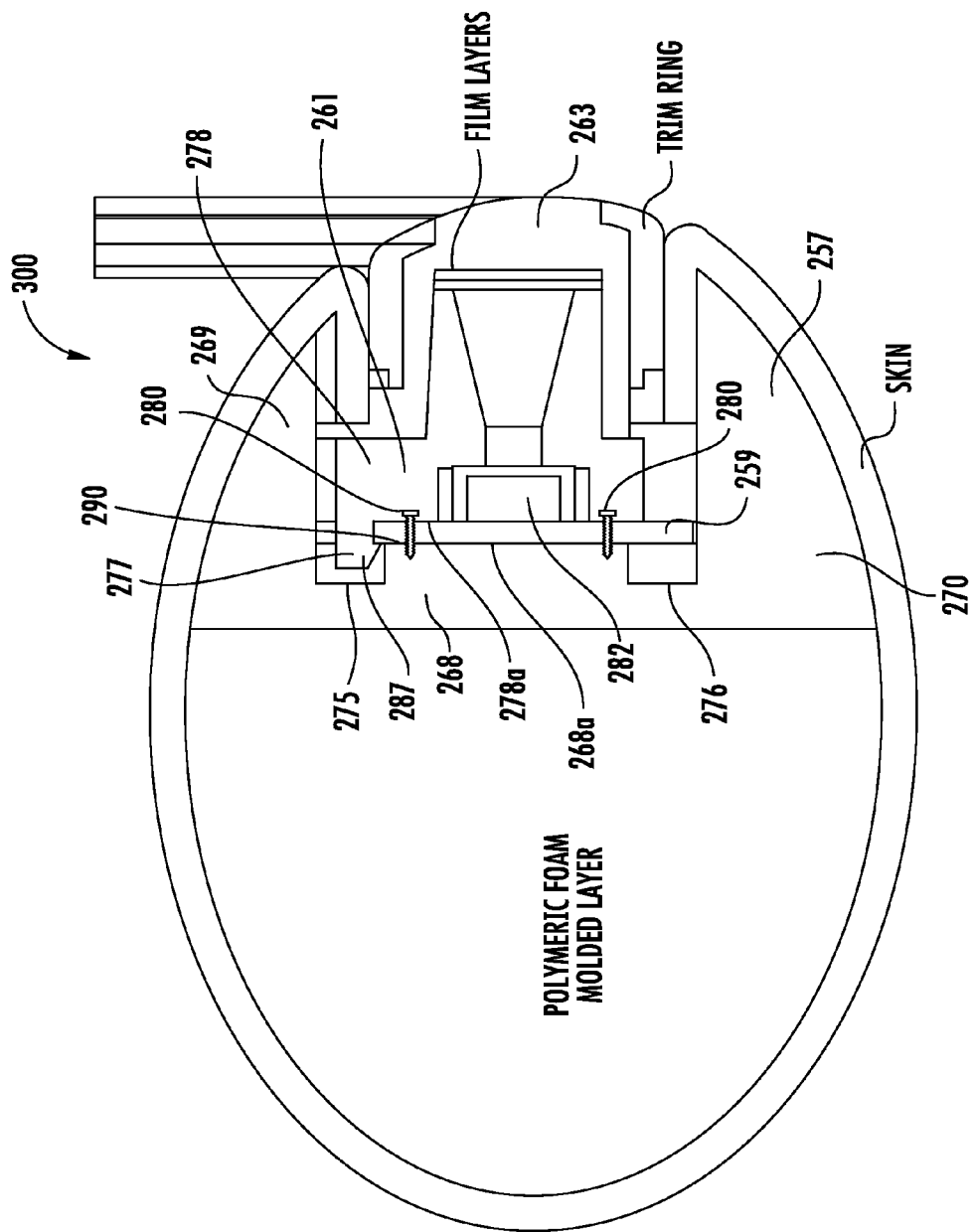
FIG. 12 is a cross-sectional view of the light bar system on a steering wheel according to another implementation.

FIG. 12 is a cross-sectional view similar to the view shown in FIGS. 2 and 5A of another implementation of a light bar system 300. The system 300 includes similar components as the system 150 shown in FIG. 11, but the carrier 261 is configured to clip or snap to the PCB 259, and the PCB 259 is screwed onto an upper surface 268b of the base 268 of the housing 257. The housing 257 may be secured to the armature (not shown) using any suitable fastening mechanism, such as those described above, or it may include one or more anchoring surfaces (not shown) that extend into the polymeric foam molded layer and are secured from moving relative to the armature by the polymeric foam molded layer. The base 268 and a portion of the side walls 269, 270 that extend from the base 268 of the housing 257 define two substantially parallel channels 275, 276 that are recessed relative to the upper surface 268a of the base 268 of the housing 257. Legs 277 extend from the lower surface 278a of the base 278 of the carrier 261, and the distal end 287 of each leg 277 is bent inwardly and configured for engaging a lower surface 290 of PCB 259. The PCB 259 in this implementation is secured to the base 268 of the housing 257 by screws 280 or other suitable fastening mechanisms, such as the fastening mechanisms described above. The parallel channels 275, 276 defined by the housing 257 allow the distal end 287 of each leg 277 to extend below and engage the lower surface 290 of the PCB 259. In addition, the implementation shown in FIG. 12 includes a trim ring that is disposed between the side portions of the lens 263 and the skin to secure the lens 263 and skin and to provide a decorative feature on the front surface of the steering wheel. However, in other implementations, the trim ring may not be included.

According to various implementations, the light diffusing layer and the light optimizing channel allow less LEDs to be used to achieve the desired lighting effects, which reduces the amount of power used by the light bar system and reduces the amount of heat generated by the light bar system.

Figure 9:
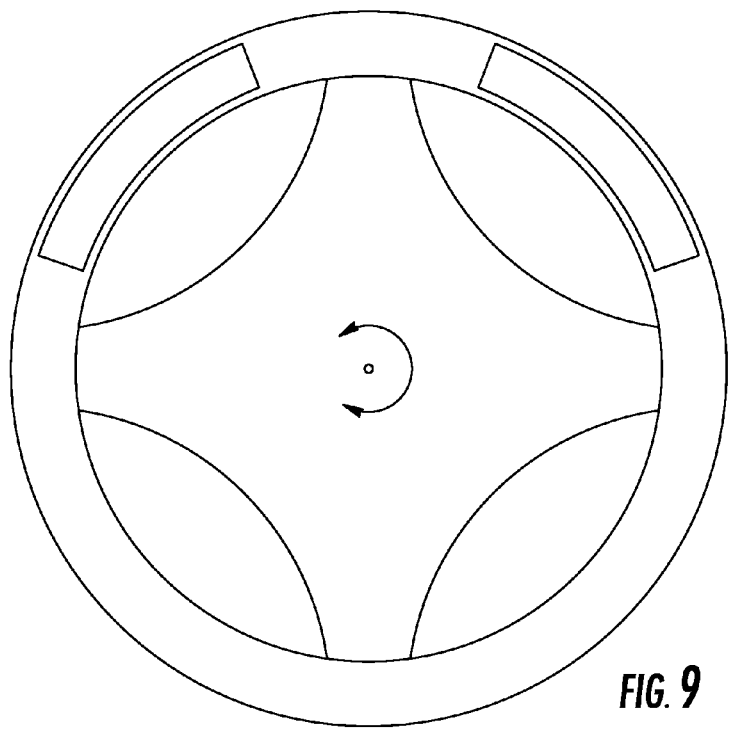
FIG. 9 is a front view of the light bar system on a steering wheel according to another implementation.
Figure 10:
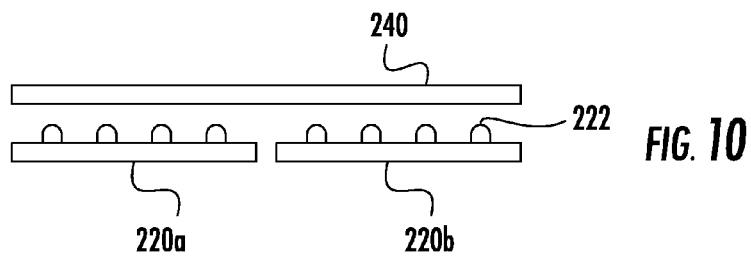
FIG. 10 is an exploded, partial view of the light bar system on a steering wheel according to another implementation.

The above described implementations include one PCB and one lens. However, in alternative implementations, such as shown in FIG. 9, the system may include two or more PCBs and/or two or more outer lens that are spaced apart from each other along the front surface of the steering wheel rim. In one alternative implementation, such as is shown in FIG. 9, the system includes a first PCB and a first lens disposed adjacent thereto disposed on a first portion of the steering wheel frame between 1 and 3 o'clock and a second PCB and second lens disposed adjacent thereto disposed on a second portion of the steering wheel between 9 and 11 o'clock. In another alternative implementation, such as shown in FIG. 10, the system includes two PCBs 220a, 220b arranged in an end to end relationship along a length of the steering wheel 100 and one lens 240 that extends over the LEDs 222 disposed on the PCBs 220a, 220b.

Furthermore, various implementations may include other types of light sources. For example, other types of light sources may include laser diodes, electroluminescence, organic light emitting diodes (OLEDs), and light emitting capacitors, according to some implementations. In addition, various implementations may include combinations of the various types of light sources, light optimizing channels, and light diffusing layers described above based on the desired orientation of the light bar system on the steering wheel, the expected position of the operator's head relative to the steering wheel, and the contemplated uses of the light bar system. For example, the lens may be angled relative to a plane that is tangent to the front surface of the steering wheel to direct light, light directing films may be used to direct light in a particular direction, and/or the light optimizing channel may be shaped to direct the light in the particular direction.

Figure 15:
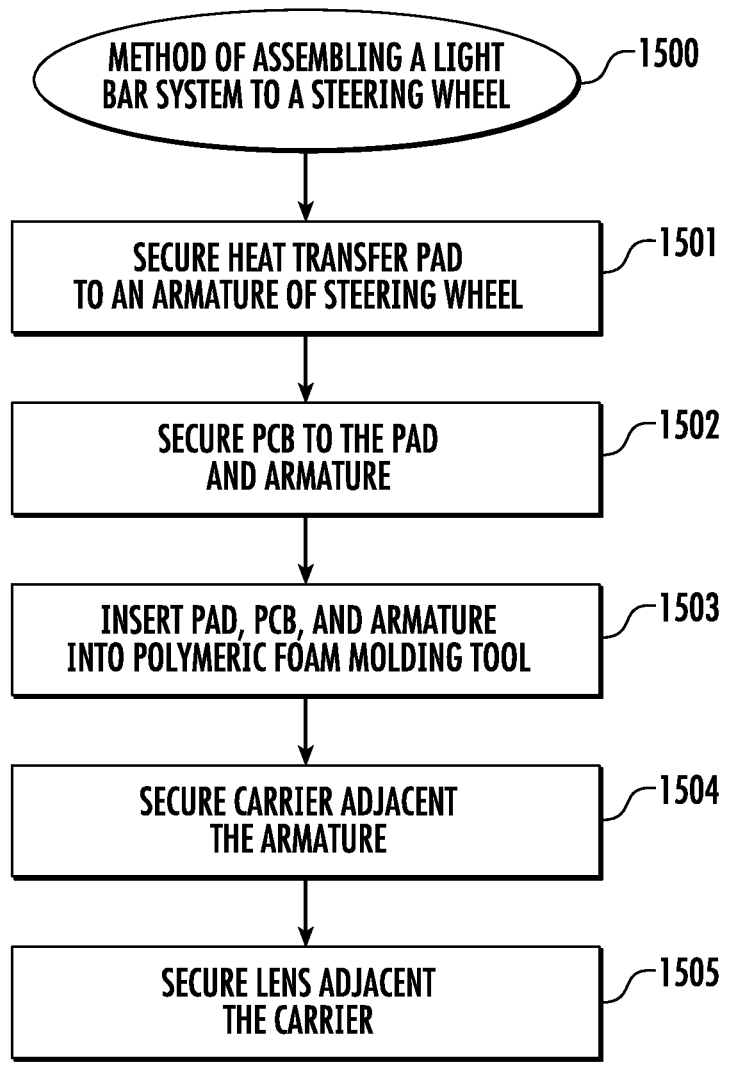
FIGS. 15 through 17 are flow charts illustrating methods of assembling a light bar system to a steering wheel according to various implementations.
Figure 16:
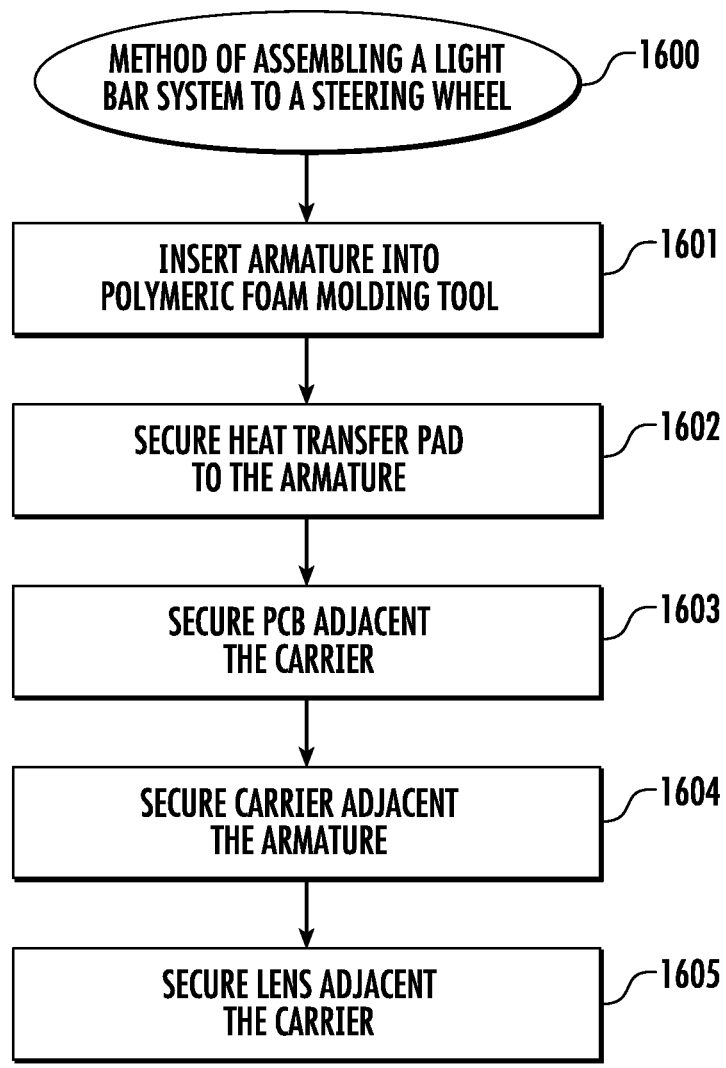
Figure 17:
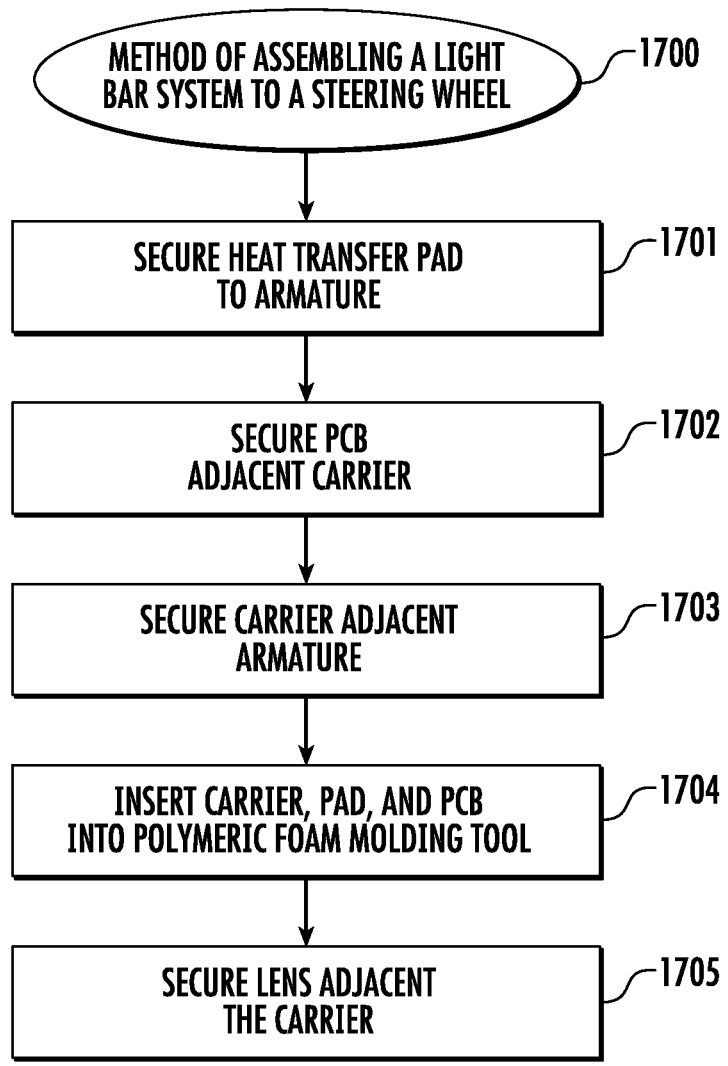

Various configurations for the various components of light bar systems and methods of assembling sub-sets of the components are described above. FIGS. 15 through 17 illustrate various implementations of methods of assembling a light bar system to a steering wheel. The steps described in relation to these methods are intended to encompass various combinations of the components and sub-assembly mechanisms described above.

In particular, FIG. 15 illustrates a method 1500 of assembling a steering wheel with a light bar system according to one implementation. At step 1501, a heat transfer pad is secured to an armature of the steering wheel, and in step 1502, a PCB is secured to the pad and armature. In step 1503, the pad, PCB, and armature are inserted into a polymeric foam molding tool for forming a polymeric foam molded layer over at least the portion of the armature not covered by the PCB and heat transfer pad. In step 1504, a carrier is secured adjacent the armature such that a light optimizing channel defined by the carrier is adjacent LEDs disposed on the PCB. In step 1505, the lens is secured adjacent the carrier.

FIG. 16 illustrates a method 1600 of assembling the light bar system to the steering wheel according to one implementation. At step 1601, the armature is inserted into a polymeric foam molding tool for forming a polymeric foam molded layer over the armature. Then at step 1602, the heat transfer pad is secured to the armature. In step 1603, the PCB is secured to the carrier, and in step 1604, the carrier is secured to the armature such that the PCB is adjacent the heat transfer pad. In step 1605, the lens is secured to the carrier. In an alternative implementation, step 1602 may not be necessary if at least the portion of the foam molded layer to be disposed between the PCB and armature includes a thermally conductive material within it.

FIG. 17 illustrates a method 1700 of assembling the light bar system to the steering wheel according to one implementation. At step 1701, the heat transfer pad is secured to the armature, and in step 1702, the PCB is secured to the carrier. In step 1703, the carrier is secured to the armature such that the PCB is adjacent the heat transfer pad. In step 1704, the carrier, pad, PCB, and armature are inserted into a polymeric foam molding tool for forming a polymeric foam molded layer over the armature and carrier. In step 1705, the lens is secured adjacent the carrier.

It should be understood that in the implementation described above in relation to FIGS. 15-17, the carrier may include a carrier that includes an integrally formed housing, such as shown in FIGS. 2-5D and 13, or a carrier that is separately formed from the housing, such as shown in FIGS. 11-12. For implementations in which the carrier is separately formed from the housing, the methods above may include the steps (not shown) of securing the housing to the armature, such as prior to steps 1504, 1604, and 1703, and securing the carrier to the housing, such as in steps 1504, 1604, and 1703.

In addition, in the implementations shown in the figures described above, the light source is disposed below a surface of the light diffusing layer that is spaced apart and opposite the layer through which light exits the light diffusing layer.

However, in other implementations, the light source may be disposed to the side of a surface of the light diffusing layer, such as a surface that is arranged at about 90° from the light exiting surface of the light diffusing layer.

While the foregoing description and drawings represent the preferred implementation of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed implementations are, therefore, to be considered in all respects as illustrative and not restrictive, the scope of the invention being indicated by the appended claims and not limited to the foregoing description.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention, as defined by the following claims.

The invention claimed is:

1. A light bar system for a steering wheel comprising:
   at least one light source disposed adjacent a portion of an armature of a steering wheel;
   a carrier defining a light optimizing channel, the light optimizing channel having a proximal end disposed adjacent the light source; and
   a light diffusing layer having an inner surface and an outer surface, the inner surface of the light diffusing layer being disposed adjacent a distal end of the light optimizing channel, and the light diffusing layer being configured for diffusing light as it passes therethrough from the inner surface to the outer surface.

2. The light bar system of claim 1, wherein the light diffusing layer is configured to cause the light being diffused there through to appear as a continuous stream of light across the light diffusing layer.

3. The light bar system of claim 1, wherein the light diffusing layer comprises a light diffusing film.

4. The light bar system of claim 1, wherein the light diffusing layer comprises an outer lens.

5. The light bar system of claim 1, further comprising an outer lens, an outer surface of the outer lens facing a driver and an inner surface of the outer lens facing the light diffusing layer.

6. The light bar system of claim 5, wherein the light diffusing layer is disposed on the inner surface of the outer lens.

7. The light bar system of claim 5, wherein the light diffusing layer is a light diffusing film, and the system further comprises one or more additional light altering films disposed between the distal end of the light optimizing channel and the inner surface of the outer lens.

8. The light bar system of claim 7, wherein the one or more additional light altering films are selected from the group consisting of: a brightness enhancing film, a light diffusing film, and a light turning film.

9. The light bar system of claim 8, wherein the one or more additional light altering films comprises a brightness enhancing film, the light diffusing film being disposed adjacent the light optimizing channel and the brightness enhancing film being disposed between the light diffusing film and the lens.

10. The light bar system of claim 9, wherein the one or more additional light altering films further comprise a light turning film, the light turning film disposed between the brightness enhancing film and the lens.

11. The light bar system of claim 9, wherein the brightness enhancing film is a first brightness enhancing film and the one or more additional light altering films further comprises a second brightness enhancing film disposed adjacent the first brightness enhancing film.

12. The light bar system of claim 5, wherein the outer surface of the outer lens is disposable in a flush relationship with an outer skin of the steering wheel.

13. The light bar system of claim 12, wherein the outer lens further comprises side portions that extend from the inner surface of the outer lens toward the armature of the steering wheel, the side portions being configured for securing the outer lens adjacent the armature.

14. The light bar system of claim 1, wherein the light diffusing layer comprises at least one light diffusing film, and the system further comprises an outer lens, wherein the light diffusing film is disposed between the distal end of the light optimizing channel and an inner surface of the outer lens.

15. The light bar system of claim 1, wherein the light diffusing layer blocks all ambient light from entering the lens.

16. The light bar system of claim 1, wherein the light source comprises one or more light emitting diodes (LEDs), and the at least one LED comprises one or more visible light LEDs and one or more infrared light LEDs.

17. The light bar system of claim 16, wherein the visible light LEDs are disposed adjacent a central portion of the PCB, and the infrared light LEDs are disposed adjacent each end of the PCB.

18. The light bar system of claim 1, wherein the surface of the light optimizing channel comprises a reflective coating.

19. The light bar system of claim 1, wherein a foam molded layer is disposed around an armature of the steering wheel and at least a portion of the carrier.

20. The light bar system of claim 1, wherein the carrier is separately formed from a foam molded layer that is disposed around an armature and is disposed adjacent the armature via one or more fasteners.

21. The light bar system of claim 20, wherein the one or more fasteners comprises a clip.

22. The light bar system of claim 1, wherein the light source comprises at least one light emitting diode (LED), and the system further comprises a printed circuit board (PCB) on which the at least one LED is disposed.

23. The light bar system of claim 22, further comprising a heat transfer pad disposed between the PCB and a steering wheel armature, the heat transfer pad configured for dissipating heat from the PCB to the steering wheel armature.

24. The light bar system of claim 1, wherein the light source comprises at least one light emitting diode (LED), and the system further comprises a printed circuit board (PCB) on which the at least one LED is disposed and wherein a foam molded layer is disposed around an armature of the steering wheel and a portion thereof comprises at least one thermally conductive material that conducts heat from the PCB to the steering wheel armature.

25. The light bar system of claim 1, wherein the light optimizing channel comprises a reflective surface extending between the proximal and distal ends.

* * * * *